US012610210B2

(12) United States Patent
Pal et al.

(10) Patent No.: US 12,610,210 B2
(45) Date of Patent: Apr. 21, 2026

(54) METHOD FOR SMARTPHONE-BASED ACCIDENT DETECTION

(71) Applicant: Credit Karma, LLC, Oakland, CA (US)

(72) Inventors: Jayanta Pal, San Francisco, CA (US); Bipul Islam, San Francisco, CA (US); Romit Roy Choudhury, San Francisco, CA (US); Pankaj Risbood, San Francisco, CA (US); Jonathan Matus, San Francisco, CA (US); Vishal Verma, San Francisco, CA (US)

(73) Assignee: Credit Karma LLC, Oakland, CA (US)

( * ) Notice: Subject to any disclaimer, the term of this patent is extended or adjusted under 35 U.S.C. 154(b) by 446 days.

(21) Appl. No.: 17/827,045

(22) Filed: May 27, 2022

(65) Prior Publication Data

US 2022/0286811 A1 Sep. 8, 2022

Related U.S. Application Data

(60) Continuation of application No. 17/071,905, filed on Oct. 15, 2020, now Pat. No. 11,375,338, which is a
(Continued)

(51) Int. Cl.
*H04W 4/02* (2018.01)
*B60R 25/24* (2013.01)
(Continued)

(52) U.S. Cl.
CPC ............. *H04W 4/027* (2013.01); *B60R 25/24* (2013.01); *B60W 40/10* (2013.01); *G06N 7/01* (2023.01);
(Continued)

(58) Field of Classification Search
CPC ....... H04W 4/027; H04W 4/029; H04W 4/40; H04W 88/00; H04M 1/72421;
(Continued)

(56) References Cited

U.S. PATENT DOCUMENTS

| | | | |
|---|---|---|---|
| 5,673,039 A | 9/1997 | Pietzsch et al. | |
| 5,864,305 A | 1/1999 | Rosenquist | |

(Continued)

FOREIGN PATENT DOCUMENTS

| | | |
|---|---|---|
| CN | 108269406 A | 7/2018 |
| CN | 108431839 A | 8/2018 |

(Continued)

OTHER PUBLICATIONS

Chandra, Sakshi , et al., "Method and System for Detecting Lateral Driving Behavior", U.S. Appl. No. 18/115,626, filed Feb. 28, 2023.
(Continued)

*Primary Examiner* — Thomas D Alunkal
*Assistant Examiner* — Thang D Tran
(74) *Attorney, Agent, or Firm* — Dinsmore & Shohl LLP

(57) ABSTRACT

A method and system for detecting an accident of a vehicle, the method including: receiving a movement dataset collected at least at one of a location sensor and a motion sensor arranged within the vehicle, during a time period of movement of the vehicle, extracting a set of movement features associated with at least one of a position, a velocity, and an acceleration characterizing the movement of the vehicle during the time period, detecting a vehicular accident event from processing the set of movement features with an accident detection model, and in response to detecting the vehicular accident event, automatically initiating an accident response action.

20 Claims, 8 Drawing Sheets

Related U.S. Application Data division of application No. 16/297,178, filed on Mar. 8, 2019, now Pat. No. 10,848,913, which is a continuation of application No. 15/492,287, filed on Apr. 20, 2017, now Pat. No. 10,279,804, which is a continuation of application No. 15/243,565, filed on Aug. 22, 2016, now Pat. No. 9,818,239.

(60) Provisional application No. 62/207,468, filed on Aug. 20, 2015.

(51) Int. Cl.

| | |
|---|---|
| *B60W 40/10* | (2012.01) |
| *G06N 7/01* | (2023.01) |
| *G06Q 40/08* | (2012.01) |
| *G06V 20/10* | (2022.01) |
| *G06V 20/56* | (2022.01) |
| *G06V 20/59* | (2022.01) |
| *G07C 5/00* | (2006.01) |
| *G07C 5/02* | (2006.01) |
| *G07C 5/08* | (2006.01) |
| *G08B 25/00* | (2006.01) |
| *G08B 25/01* | (2006.01) |
| *G08G 1/01* | (2006.01) |
| *H04M 1/72421* | (2021.01) |
| *H04W 4/029* | (2018.01) |
| *H04W 4/40* | (2018.01) |
| *G06V 40/10* | (2022.01) |
| *H04W 88/00* | (2009.01) |

(52) U.S. Cl.
CPC ............. *G06Q 40/08* (2013.01); *G06V 20/10* (2022.01); *G06V 20/56* (2022.01); *G06V 20/597* (2022.01); *G07C 5/008* (2013.01); *G07C 5/02* (2013.01); *G07C 5/0808* (2013.01); *G07C 5/0866* (2013.01); *G08B 25/00* (2013.01); *G08B 25/001* (2013.01); *G08B 25/006* (2013.01); *G08B 25/016* (2013.01); *G08G 1/012* (2013.01); *G08G 1/0129* (2013.01); *H04M 1/72421* (2021.01); *H04W 4/029* (2018.02); *H04W 4/40* (2018.02); *B60R 2325/205* (2013.01); *G06V 40/15* (2022.01); *H04M 2250/12* (2013.01); *H04W 88/00* (2013.01)

(58) Field of Classification Search
CPC ...... G06V 20/597; G06V 20/10; G06V 20/56; G06V 40/15; G06N 7/01; B60R 25/24; B60R 2325/205; B60W 40/10; G06Q 40/08; G07C 5/02; G07C 5/0808; G07C 5/0866; G08B 25/00; G08B 25/001; G08B 25/006; G08B 25/016; G08G 1/012; G08G 1/0129; H04N 2250/12
USPC ........................................................ 340/436
See application file for complete search history.

(56) References Cited

U.S. PATENT DOCUMENTS

| | | | | |
|---|---|---|---|---|
| 6,049,778 | A | 4/2000 | Walker et al. | |
| 6,055,477 | A | 4/2000 | McBurney et al. | |
| 6,064,318 | A | 5/2000 | Kirchner et al. | |
| 6,178,374 | B1 | 1/2001 | Moehlenkamp et al. | |
| 6,240,364 | B1 | 5/2001 | Kerner et al. | |
| 6,474,683 | B1 * | 11/2002 | Breed ...................... | G01S 7/417 |
| | | | | 701/45 |
| 6,826,477 | B2 | 11/2004 | Ladetto et al. | |
| 6,941,222 | B2 | 9/2005 | Yano et al. | |

| | | | | |
|---|---|---|---|---|
| 7,065,449 | B2 | 6/2006 | Brewster et al. | |
| 7,532,196 | B2 | 5/2009 | Hinckley | |
| 7,668,931 | B2 | 2/2010 | Parupudi et al. | |
| 7,801,675 | B2 | 9/2010 | Currie et al. | |
| 7,881,868 | B2 | 2/2011 | Greene et al. | |
| 8,054,168 | B2 | 11/2011 | McCormick et al. | |
| 8,179,281 | B2 * | 5/2012 | Strauss ................... | G08G 1/163 |
| | | | | 340/436 |
| 8,264,375 | B2 | 9/2012 | DeVries | |
| 8,290,480 | B2 | 10/2012 | Abramson et al. | |
| 8,326,257 | B2 | 12/2012 | Shiu et al. | |
| 8,352,189 | B2 | 1/2013 | Scott et al. | |
| 8,369,876 | B2 | 2/2013 | Bachmann et al. | |
| 8,395,542 | B2 | 3/2013 | Scherzinger et al. | |
| 8,489,330 | B2 | 7/2013 | Ellanti et al. | |
| 8,498,610 | B2 | 7/2013 | Staehlin | |
| 8,504,035 | B2 | 8/2013 | Shin et al. | |
| 8,521,193 | B2 | 8/2013 | Paek et al. | |
| 8,577,703 | B2 | 11/2013 | McClellan et al. | |
| 8,634,822 | B2 | 1/2014 | Silver et al. | |
| 8,731,530 | B1 | 5/2014 | Breed et al. | |
| 8,731,974 | B1 | 5/2014 | Pandhi et al. | |
| 8,738,523 | B1 | 5/2014 | Sanchez et al. | |
| 8,754,766 | B2 | 6/2014 | Oesterling et al. | |
| 8,912,103 | B2 | 12/2014 | Heo et al. | |
| 8,971,927 | B2 | 3/2015 | Zhou et al. | |
| 8,972,103 | B2 | 3/2015 | Elwart et al. | |
| 8,989,914 | B1 | 3/2015 | Nemat-Nasser et al. | |
| 8,996,234 | B1 * | 3/2015 | Tamari ................... | B60W 40/09 |
| | | | | 701/123 |
| 9,064,412 | B2 | 6/2015 | Baur | |
| 9,121,940 | B2 | 9/2015 | Psiaki et al. | |
| 9,141,974 | B2 | 9/2015 | Jones et al. | |
| 9,185,526 | B2 | 11/2015 | Guba et al. | |
| 9,188,451 | B2 | 11/2015 | Magnusson et al. | |
| 9,221,428 | B2 | 12/2015 | Kote et al. | |
| 9,222,798 | B2 | 12/2015 | Curtis et al. | |
| 9,224,293 | B2 | 12/2015 | Taylor | |
| 9,250,090 | B2 | 2/2016 | Hille et al. | |
| 9,311,211 | B2 | 4/2016 | Chatterjee et al. | |
| 9,311,271 | B2 | 4/2016 | Wright | |
| 9,360,323 | B2 | 6/2016 | Grokop | |
| 9,368,027 | B2 | 6/2016 | Jang et al. | |
| 9,390,625 | B2 | 7/2016 | Green et al. | |
| 9,414,221 | B1 | 8/2016 | Simon et al. | |
| 9,423,318 | B2 | 8/2016 | Liu et al. | |
| 9,449,495 | B1 * | 9/2016 | Call ...................... | H04W 4/029 |
| 9,457,754 | B1 * | 10/2016 | Christensen ........... | G08G 1/205 |
| 9,467,515 | B1 | 10/2016 | Penilla et al. | |
| 9,495,601 | B2 | 11/2016 | Hansen | |
| 9,536,428 | B1 | 1/2017 | Wasserman | |
| 9,558,520 | B2 | 1/2017 | Peak et al. | |
| 9,564,047 | B2 | 2/2017 | Wu | |
| 9,566,981 | B2 | 2/2017 | Rebhan et al. | |
| 9,587,952 | B1 | 3/2017 | Slusar | |
| 9,628,975 | B1 * | 4/2017 | Watkins ................ | H04W 4/027 |
| 9,632,507 | B1 | 4/2017 | Korn | |
| 9,633,487 | B2 | 4/2017 | Wright | |
| 9,645,970 | B2 | 5/2017 | Boesch et al. | |
| 9,650,007 | B1 | 5/2017 | Snyder et al. | |
| 9,674,370 | B2 | 6/2017 | Kim et al. | |
| 9,689,698 | B2 | 6/2017 | Wesselius et al. | |
| 9,716,978 | B2 | 7/2017 | Sankaran | |
| 9,731,713 | B2 | 8/2017 | Horii | |
| 9,733,089 | B2 | 8/2017 | Choudhury et al. | |
| 9,773,281 | B1 | 9/2017 | Hanson | |
| 9,794,729 | B2 | 10/2017 | Meyers et al. | |
| 9,800,716 | B2 | 10/2017 | Abramson et al. | |
| 9,801,027 | B2 | 10/2017 | Levy et al. | |
| 9,805,601 | B1 | 10/2017 | Fields et al. | |
| 9,818,239 | B2 * | 11/2017 | Pal ...................... | G08B 25/001 |
| 9,842,120 | B1 | 12/2017 | Siris et al. | |
| 9,852,475 | B1 | 12/2017 | Konrardy et al. | |
| 9,854,396 | B2 | 12/2017 | Himmelreich et al. | |
| 9,868,394 | B1 | 1/2018 | Fields et al. | |
| 9,870,649 | B1 | 1/2018 | Fields et al. | |
| 9,888,392 | B1 * | 2/2018 | Snyder ................... | H04W 4/44 |
| 9,896,030 | B2 * | 2/2018 | Sugimoto ............. | G06V 20/58 |
| 9,900,747 | B1 | 2/2018 | Park | |

(56) References Cited

U.S. PATENT DOCUMENTS

| | | | |
|---|---|---|---|
| 9,928,432 B1 | 3/2018 | Sathyanarayana et al. | |
| 9,932,033 B2 | 4/2018 | Slusar et al. | |
| 9,955,319 B2 | 4/2018 | Matus et al. | |
| 9,994,218 B2 | 6/2018 | Pal et al. | |
| 9,996,811 B2 | 6/2018 | Matus et al. | |
| 10,012,993 B1 | 7/2018 | Matus et al. | |
| 10,137,889 B2 | 11/2018 | Pal et al. | |
| 10,154,382 B2 | 12/2018 | Matus | |
| 10,157,423 B1 | 12/2018 | Fields et al. | |
| 10,165,406 B2 | 12/2018 | Hong et al. | |
| 10,176,524 B1 | 1/2019 | Brandmaier et al. | |
| 10,278,039 B1 | 4/2019 | Matus et al. | |
| 10,304,329 B2 | 5/2019 | Matus et al. | |
| 10,324,463 B1 | 6/2019 | Konrardy et al. | |
| 10,386,192 B1 | 8/2019 | Konrardy et al. | |
| 10,510,123 B1 | 12/2019 | Konrardy et al. | |
| 10,533,870 B1 | 1/2020 | Slusar | |
| 10,559,196 B2 | 2/2020 | Matus et al. | |
| 10,733,460 B2 | 8/2020 | Heck et al. | |
| 10,803,527 B1* | 10/2020 | Zankat | G06V 30/40 |
| 10,824,145 B1 | 11/2020 | Konrardy et al. | |
| 10,848,913 B2 | 11/2020 | Pal et al. | |
| 10,872,525 B2 | 12/2020 | Xu et al. | |
| 10,885,592 B2 | 1/2021 | Hsu-Hoffman et al. | |
| 10,983,523 B2 | 4/2021 | Sim | |
| 11,062,594 B2 | 7/2021 | Matus et al. | |
| 11,170,446 B1 | 11/2021 | Thurber | |
| 11,175,152 B2 | 11/2021 | Pal et al. | |
| 11,521,371 B2 | 12/2022 | Omari et al. | |
| 11,568,434 B2 | 1/2023 | Bax et al. | |
| 11,735,037 B2 | 8/2023 | Matus et al. | |
| 11,775,010 B2* | 10/2023 | Matus | G06V 10/764 |
| | | | 701/1 |
| 2001/0042976 A1* | 11/2001 | Breed | B60N 2/2863 |
| | | | 280/735 |
| 2002/0140215 A1* | 10/2002 | Breed | B60N 2/2863 |
| | | | 280/735 |
| 2002/0161517 A1 | 10/2002 | Yano et al. | |
| 2002/0161518 A1 | 10/2002 | Petzold et al. | |
| 2003/0018430 A1 | 1/2003 | Ladetto et al. | |
| 2003/0154009 A1* | 8/2003 | Basir | G07C 5/0866 |
| | | | 348/148 |
| 2004/0046335 A1 | 3/2004 | Knox et al. | |
| 2004/0082311 A1 | 4/2004 | Shiu et al. | |
| 2005/0080555 A1 | 4/2005 | Parupudi et al. | |
| 2005/0093868 A1 | 5/2005 | Hinckley | |
| 2005/0197773 A1 | 9/2005 | Brewster et al. | |
| 2005/0288856 A1 | 12/2005 | Ohki et al. | |
| 2006/0153198 A1 | 7/2006 | Chadha | |
| 2007/0005228 A1 | 1/2007 | Sutardja | |
| 2007/0050850 A1* | 3/2007 | Katoh | H04L 63/105 |
| | | | 726/1 |
| 2007/0063854 A1* | 3/2007 | Zhang | B60W 40/09 |
| | | | 340/576 |
| 2007/0208494 A1 | 9/2007 | Chapman et al. | |
| 2007/0208501 A1 | 9/2007 | Downs et al. | |
| 2008/0033776 A1 | 2/2008 | Marchese | |
| 2008/0103907 A1 | 5/2008 | Maislos et al. | |
| 2008/0243439 A1 | 10/2008 | Runkle et al. | |
| 2008/0312832 A1 | 12/2008 | Greene et al. | |
| 2009/0024419 A1 | 1/2009 | McClellan et al. | |
| 2009/0048776 A1* | 2/2009 | Bouillet | G08G 1/0969 |
| | | | 701/414 |
| 2010/0030582 A1 | 2/2010 | Rippel et al. | |
| 2010/0056175 A1 | 3/2010 | Bachmann et al. | |
| 2010/0100398 A1 | 4/2010 | Auker et al. | |
| 2010/0106406 A1 | 4/2010 | Hille et al. | |
| 2010/0131304 A1 | 5/2010 | Collopy et al. | |
| 2010/0198517 A1 | 8/2010 | Scott et al. | |
| 2010/0219944 A1 | 9/2010 | Mc Cormick et al. | |
| 2010/0250131 A1* | 9/2010 | Relyea | H04W 4/185 |
| | | | 701/469 |
| 2010/0273508 A1 | 10/2010 | Parata et al. | |
| 2010/0299021 A1 | 11/2010 | Jalili | |
| 2010/0332131 A1 | 12/2010 | Horvitz et al. | |
| 2011/0077028 A1 | 3/2011 | Wilkes et al. | |
| 2011/0124311 A1 | 5/2011 | Staehlin | |
| 2011/0161116 A1 | 6/2011 | Peak et al. | |
| 2011/0224898 A1 | 9/2011 | Scofield et al. | |
| 2011/0246156 A1 | 10/2011 | Zecha et al. | |
| 2011/0294520 A1 | 12/2011 | Zhou et al. | |
| 2012/0050095 A1 | 3/2012 | Scherzinger et al. | |
| 2012/0065871 A1 | 3/2012 | Deshpande et al. | |
| 2012/0066053 A1 | 3/2012 | Agarwal | |
| 2012/0071151 A1 | 3/2012 | Abramson et al. | |
| 2012/0089328 A1 | 4/2012 | Ellanti et al. | |
| 2012/0109517 A1 | 5/2012 | Watanabe | |
| 2012/0116819 A1* | 5/2012 | Hertenstein | G06Q 10/10 |
| | | | 705/4 |
| 2012/0129545 A1 | 5/2012 | Hodis et al. | |
| 2012/0136529 A1 | 5/2012 | Curtis et al. | |
| 2012/0136567 A1 | 5/2012 | Wang et al. | |
| 2012/0149400 A1 | 6/2012 | Paek et al. | |
| 2012/0158820 A1 | 6/2012 | Bai et al. | |
| 2012/0197587 A1 | 8/2012 | Luk et al. | |
| 2012/0226421 A1 | 9/2012 | Kote et al. | |
| 2012/0245963 A1 | 9/2012 | Peak et al. | |
| 2013/0006469 A1 | 1/2013 | Green et al. | |
| 2013/0041521 A1 | 2/2013 | Basir et al. | |
| 2013/0052614 A1 | 2/2013 | Mollicone et al. | |
| 2013/0069802 A1* | 3/2013 | Foghel | G08G 1/205 |
| | | | 340/436 |
| 2013/0096731 A1 | 4/2013 | Tamari et al. | |
| 2013/0124074 A1 | 5/2013 | Horvitz et al. | |
| 2013/0130639 A1 | 5/2013 | Oesterling et al. | |
| 2013/0204515 A1 | 8/2013 | Emura | |
| 2013/0211618 A1 | 8/2013 | Iachini | |
| 2013/0218603 A1* | 8/2013 | Hagelstein | G06F 3/0481 |
| | | | 705/4 |
| 2013/0282264 A1 | 10/2013 | Bastiaensen et al. | |
| 2013/0289819 A1 | 10/2013 | Hassib et al. | |
| 2013/0302758 A1 | 11/2013 | Wright | |
| 2013/0304514 A1* | 11/2013 | Hyde | G06Q 40/08 |
| | | | 705/4 |
| 2013/0316737 A1 | 11/2013 | Guba et al. | |
| 2013/0317860 A1 | 11/2013 | Schumann | |
| 2013/0325517 A1 | 12/2013 | Berg | |
| 2013/0332357 A1 | 12/2013 | Green et al. | |
| 2013/0344856 A1 | 12/2013 | Silver et al. | |
| 2014/0009275 A1* | 1/2014 | Bowers | G06Q 20/145 |
| | | | 340/436 |
| 2014/0038640 A1 | 2/2014 | Wesselius et al. | |
| 2014/0046896 A1 | 2/2014 | Potter | |
| 2014/0074402 A1 | 3/2014 | Hassib et al. | |
| 2014/0081670 A1 | 3/2014 | Lim et al. | |
| 2014/0168399 A1* | 6/2014 | Plummer | G08B 21/02 |
| | | | 348/78 |
| 2014/0188638 A1 | 7/2014 | Jones et al. | |
| 2014/0197967 A1 | 7/2014 | Modica et al. | |
| 2014/0207497 A1 | 7/2014 | Collins et al. | |
| 2014/0232592 A1 | 8/2014 | Psiaki et al. | |
| 2014/0244150 A1 | 8/2014 | Boesch et al. | |
| 2014/0244156 A1 | 8/2014 | Magnusson et al. | |
| 2014/0266789 A1 | 9/2014 | Matus | |
| 2014/0288765 A1 | 9/2014 | Elwart et al. | |
| 2014/0288828 A1 | 9/2014 | Werner et al. | |
| 2014/0293053 A1* | 10/2014 | Chuang | B60K 28/066 |
| | | | 348/148 |
| 2014/0358321 A1 | 12/2014 | Ibrahim | |
| 2014/0358394 A1 | 12/2014 | Picciotti | |
| 2014/0380264 A1* | 12/2014 | Misra | H04L 67/12 |
| | | | 717/100 |
| 2015/0025917 A1 | 1/2015 | Stempora | |
| 2015/0035662 A1* | 2/2015 | Bowers | G08G 1/165 |
| | | | 340/436 |
| 2015/0046197 A1* | 2/2015 | Peng | B60W 40/09 |
| | | | 701/31.5 |
| 2015/0084757 A1* | 3/2015 | Annibale | H04W 4/90 |
| | | | 340/436 |
| 2015/0087264 A1 | 3/2015 | Goyal | |
| 2015/0097703 A1 | 4/2015 | Baur | |

(56) References Cited

U.S. PATENT DOCUMENTS

| | | | |
|---|---|---|---|
| 2015/0112545 A1* | 4/2015 | Binion | G07C 5/12 |
| | | | 701/1 |
| 2015/0112731 A1 | 4/2015 | Binion et al. | |
| 2015/0112800 A1* | 4/2015 | Binion | G06Q 30/0255 |
| | | | 705/14.53 |
| 2015/0145662 A1* | 5/2015 | Barfield, Jr. | G08B 21/0492 |
| | | | 340/436 |
| 2015/0187146 A1* | 7/2015 | Chen | G07C 5/02 |
| | | | 701/31.5 |
| 2015/0229666 A1 | 8/2015 | Foster et al. | |
| 2015/0233718 A1 | 8/2015 | Grokop | |
| 2015/0246654 A1 | 9/2015 | Tadic et al. | |
| 2015/0294422 A1* | 10/2015 | Carver | G06Q 40/08 |
| | | | 705/4 |
| 2015/0327034 A1 | 11/2015 | Abramson et al. | |
| 2015/0329121 A1 | 11/2015 | Lim et al. | |
| 2015/0332407 A1* | 11/2015 | Wilson, II | G06V 10/751 |
| | | | 705/4 |
| 2015/0334545 A1 | 11/2015 | Maier et al. | |
| 2015/0365810 A1* | 12/2015 | Yamaguchi | G06Q 50/265 |
| | | | 701/32.2 |
| 2015/0365979 A1* | 12/2015 | Park | H04W 4/02 |
| | | | 455/404.2 |
| 2015/0375756 A1* | 12/2015 | Do | B60W 30/08 |
| | | | 701/1 |
| 2016/0021238 A1 | 1/2016 | Abramson et al. | |
| 2016/0033366 A1 | 2/2016 | Liu et al. | |
| 2016/0042767 A1 | 2/2016 | Araya et al. | |
| 2016/0048399 A1 | 2/2016 | Shaw | |
| 2016/0059855 A1 | 3/2016 | Rebhan et al. | |
| 2016/0068156 A1 | 3/2016 | Horii | |
| 2016/0086285 A1 | 3/2016 | Jordan et al. | |
| 2016/0091328 A1* | 3/2016 | Ould-Ahmen-Vall | |
| | | | G01C 21/3492 |
| | | | 701/117 |
| 2016/0093197 A1* | 3/2016 | See | G08B 25/10 |
| | | | 340/539.12 |
| 2016/0093212 A1* | 3/2016 | Barfield, Jr. | G08G 1/0133 |
| | | | 348/144 |
| 2016/0094964 A1* | 3/2016 | Barfield, Jr. | H04W 4/90 |
| | | | 340/870.07 |
| 2016/0129913 A1 | 5/2016 | Boesen | |
| 2016/0133130 A1 | 5/2016 | Grimm et al. | |
| 2016/0150070 A1* | 5/2016 | Goren | H04M 1/72421 |
| | | | 455/418 |
| 2016/0171521 A1 | 6/2016 | Ramirez et al. | |
| 2016/0174049 A1 | 6/2016 | Levy et al. | |
| 2016/0189303 A1 | 6/2016 | Fuchs | |
| 2016/0189442 A1 | 6/2016 | Wright | |
| 2016/0225263 A1 | 8/2016 | Salentiny et al. | |
| 2016/0232785 A1 | 8/2016 | Wang | |
| 2016/0269852 A1 | 9/2016 | Meyers et al. | |
| 2016/0272140 A1* | 9/2016 | Kim | G08B 25/004 |
| 2016/0282156 A1 | 9/2016 | Ott et al. | |
| 2016/0318445 A1* | 11/2016 | Sugimoto | G06F 3/00 |
| 2016/0325756 A1 | 11/2016 | Cordova et al. | |
| 2016/0328893 A1 | 11/2016 | Cordova et al. | |
| 2016/0339910 A1 | 11/2016 | Jonasson et al. | |
| 2016/0358081 A1* | 12/2016 | Cama | G08G 1/04 |
| 2016/0358315 A1 | 12/2016 | Zhou et al. | |
| 2016/0358477 A1* | 12/2016 | Ansari | B60W 60/0059 |
| 2016/0364983 A1 | 12/2016 | Downs et al. | |
| 2016/0375908 A1* | 12/2016 | Biemer | G07C 5/008 |
| | | | 701/1 |
| 2016/0379310 A1 | 12/2016 | Madigan et al. | |
| 2016/0379485 A1 | 12/2016 | Anastassov et al. | |
| 2016/0381505 A1 | 12/2016 | Sankaran | |
| 2017/0001648 A1* | 1/2017 | An | B60W 40/08 |
| 2017/0034656 A1 | 2/2017 | Wang et al. | |
| 2017/0053461 A1 | 2/2017 | Pal et al. | |
| 2017/0097243 A1 | 4/2017 | Ricci | |
| 2017/0103342 A1 | 4/2017 | Rajani et al. | |
| 2017/0103588 A1 | 4/2017 | Rajani et al. | |
| 2017/0115125 A1 | 4/2017 | Outwater et al. | |
| 2017/0116792 A1 | 4/2017 | Jelinek et al. | |
| 2017/0124660 A1 | 5/2017 | Srivastava | |
| 2017/0126810 A1 | 5/2017 | Kentley et al. | |
| 2017/0138737 A1 | 5/2017 | Cordova et al. | |
| 2017/0164158 A1 | 6/2017 | Watkins et al. | |
| 2017/0178416 A1 | 6/2017 | Barreira Avegliano et al. | |
| 2017/0178422 A1 | 6/2017 | Wright | |
| 2017/0178424 A1 | 6/2017 | Wright | |
| 2017/0210323 A1 | 7/2017 | Cordova et al. | |
| 2017/0211939 A1 | 7/2017 | Cordova et al. | |
| 2017/0221150 A1* | 8/2017 | Bichacho | G06Q 40/08 |
| 2017/0232963 A1 | 8/2017 | Pal et al. | |
| 2017/0234689 A1 | 8/2017 | Gibson et al. | |
| 2017/0241791 A1 | 8/2017 | Madigan et al. | |
| 2017/0279947 A1 | 9/2017 | Rajakarunanayake et al. | |
| 2017/0289754 A1 | 10/2017 | Anderson et al. | |
| 2017/0369055 A1 | 12/2017 | Saigusa et al. | |
| 2017/0371608 A1 | 12/2017 | Wasserman | |
| 2018/0061230 A1 | 3/2018 | Madigan et al. | |
| 2018/0075309 A1 | 3/2018 | Sathyanarayana et al. | |
| 2018/0090001 A1 | 3/2018 | Fletcher | |
| 2018/0154908 A1 | 6/2018 | Chen | |
| 2018/0158329 A1 | 6/2018 | Benhammou et al. | |
| 2018/0165531 A1 | 6/2018 | Sathyanarayana et al. | |
| 2018/0174446 A1 | 6/2018 | Wang | |
| 2018/0276485 A1 | 9/2018 | Heck et al. | |
| 2018/0308128 A1 | 10/2018 | DeLuca et al. | |
| 2019/0007511 A1 | 1/2019 | Rodriguez et al. | |
| 2019/0035266 A1 | 1/2019 | Riess et al. | |
| 2019/0281416 A1 | 9/2019 | Watkins et al. | |
| 2019/0295133 A1 | 9/2019 | Hirtenstein et al. | |
| 2021/0197720 A1 | 7/2021 | Houston et al. | |
| 2021/0309261 A1 | 10/2021 | Rosales et al. | |
| 2022/0005291 A1 | 1/2022 | Konrardy et al. | |
| 2022/0180448 A1 | 6/2022 | Konrardy et al. | |
| 2023/0177414 A1 | 6/2023 | Bhattacharya et al. | |
| 2023/0271618 A1 | 8/2023 | Chandra et al. | |

FOREIGN PATENT DOCUMENTS

| | | |
|---|---|---|
| CN | 108819841 A | 11/2018 |
| DE | 3439000 A1 | 4/1986 |
| DE | 102008008555 | 8/2008 |
| DE | 102017221643 A1 | 7/2018 |
| EP | 0534892 A1 | 3/1993 |
| EP | 3638542 B1 | 1/2022 |
| GB | 2492369 B | 4/2014 |
| JP | 2000009482 A | 1/2000 |
| JP | 2002215236 A | 7/2002 |
| JP | 2003006439 A | 1/2003 |
| JP | 2005098904 A | 4/2005 |
| JP | 2007212265 A | 8/2007 |
| JP | 2008298475 A | 12/2008 |
| JP | 2009133702 A | 6/2009 |
| JP | 2011133240 A | 7/2011 |
| JP | 2012008675 A | 1/2012 |
| JP | 2013195143 A | 9/2013 |
| JP | 2013200223 A | 10/2013 |
| JP | 2014154005 A | 8/2014 |
| JP | 2019522295 A | 8/2019 |
| KR | 20130106106 A | 9/2013 |
| WO | 2004085220 | 10/2004 |
| WO | 2006000166 A1 | 1/2006 |
| WO | 2007066611 A1 | 6/2007 |
| WO | 2015122729 A1 | 8/2015 |
| WO | 2018002894 A1 | 1/2018 |

OTHER PUBLICATIONS

Chu, Hon Lung , "In-Vehicle Driver Detection Using Mobile Phone Sensors", https://ece.duke.edu/sites/ece.duke.edu/files/ GWDD2011_Chu.pdf—2011 (Year: 2011).

Das, Tathagata , et al., "PRISM: Platform for Remote Sensing using Smartphones", In. Proc. Mobisys '10, Jun. 15-18, 2010, San Francisco, USA, pp. 63-76., Jan. 2, 2018 00:00:00.0.

Giuseppe, Guido , et al., "Using Smartphones as a Tool to Capture Road Traffic Attributes", University of Calabria, Department of

(56) References Cited

OTHER PUBLICATIONS

Civil Engineering, via P.Bucci, 87036—Rende (CS) Italy, Applied Mechanics and Materials, vol. 432 (2013, Trans Tech Publications, Switzerland, pp. 513-519.
Jiangqiang , et al., "Driver Pre-Accident Operation Mode Study Based on Vehicle-Vehicle Traffic Accidents", 2011, Publisher: IEEE.
Kalra, Nidhi , Analyzing Driving and Road Events via Smartphone, International Journal of Computer Applications (0975-8887), vol. 98—No. 12, Jul. 2014, pp. 5-9.
Liang-Bi , et al., "An Implementation of Deep Learning based IoV System for Traffic Accident Collisions Detection with an Emergency Alert Mechanism", 2018, Publisher: IEE.
Mohan, Prashanth , et al., Nericell: Rich Monitoring of Road and Traffic Conditions using Mobile Smartphones. Microsoft Research India, SenSys '08, Nov. 5-7, 2008, Raleigh North Carolina, USA, 14 pages.
Pattara-Atikom, W. , et al., "Estimating Road Traffic Congestion using Vehicle Velocity", 2006, Publisher: IEEE.
Short, Jeffrey , et al., "Identifying Autonomous Vehicle Technology Impacts on the Trucking Industry", http://atri-online.org/wp-content/uploads/2016/11/ATRI-Autonomous-Vehicle-Impacts-11-2016.pdf (Year: 2016).
Walter, Debbie , et al., "Novel Environmental Features for Robust Multisensor Navigation", Institute of Navigation GNSS+ 2013, pp. 1-6.

* cited by examiner

100

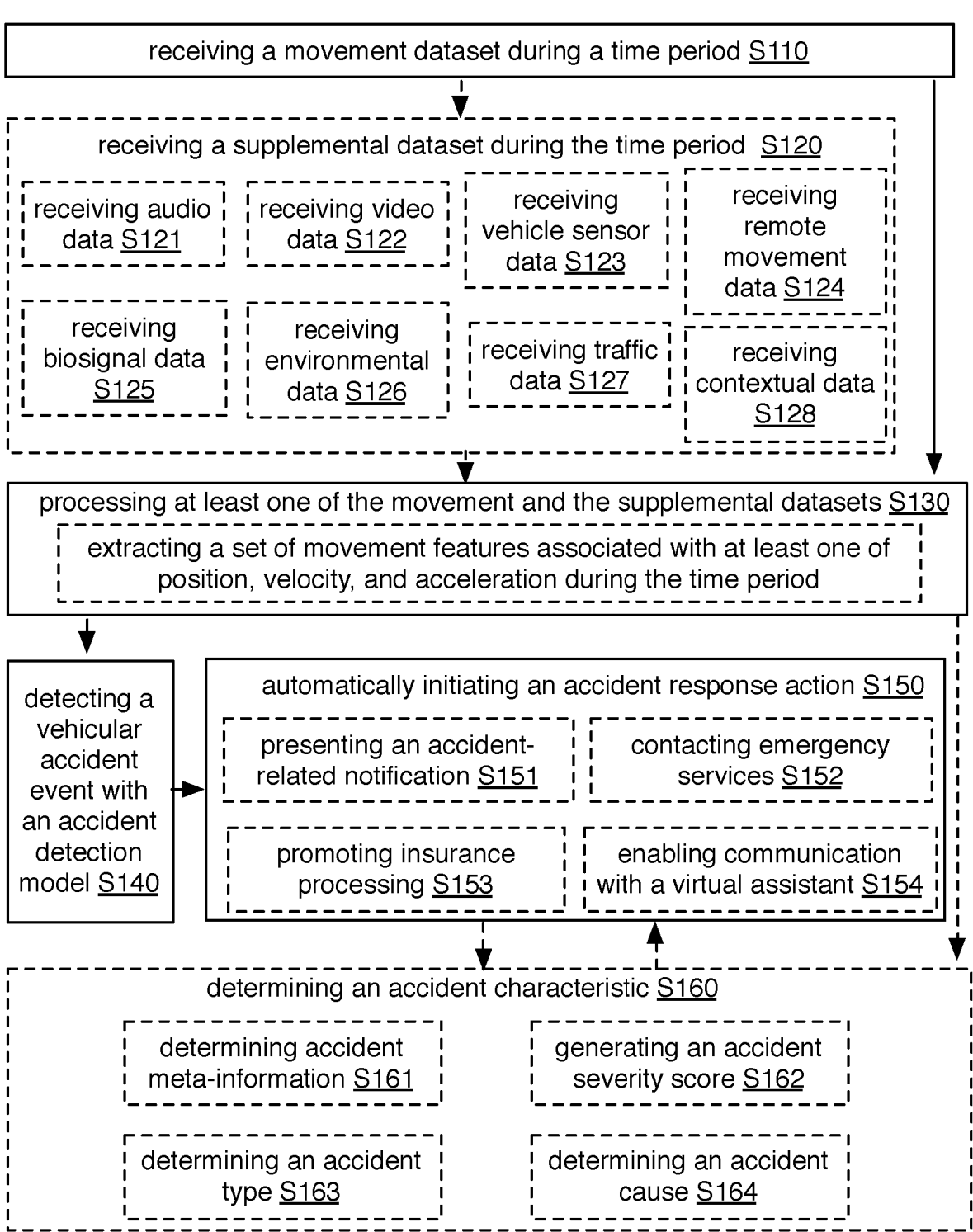

receiving a movement dataset during a time period S110 receiving a supplemental dataset during the time period  S120 receiving audio data S121 receiving video data S122 receiving vehicle sensor data S123 receiving remote movement data S124 receiving biosignal data S125 receiving environmental data S126 receiving traffic data S127 receiving contextual data S128 processing at least one of the movement and the supplemental datasets S130 extracting a set of movement features associated with at least one of position, velocity, and acceleration during the time period detecting a vehicular accident event with an accident detection model S140 automatically initiating an accident response action S150 presenting an accident-related notification S151 contacting emergency services S152 promoting insurance processing S153 enabling communication with a virtual assistant S154 determining an accident characteristic S160 determining accident meta-information S161 generating an accident severity score S162 determining an accident type S163 determining an accident cause S164

FIGURE 2 location dataset motion dataset

HIGH TRAFFIC AHEAD

200

210 220

230 240 260

250 accident charactersitic vehicular accident event accident response action

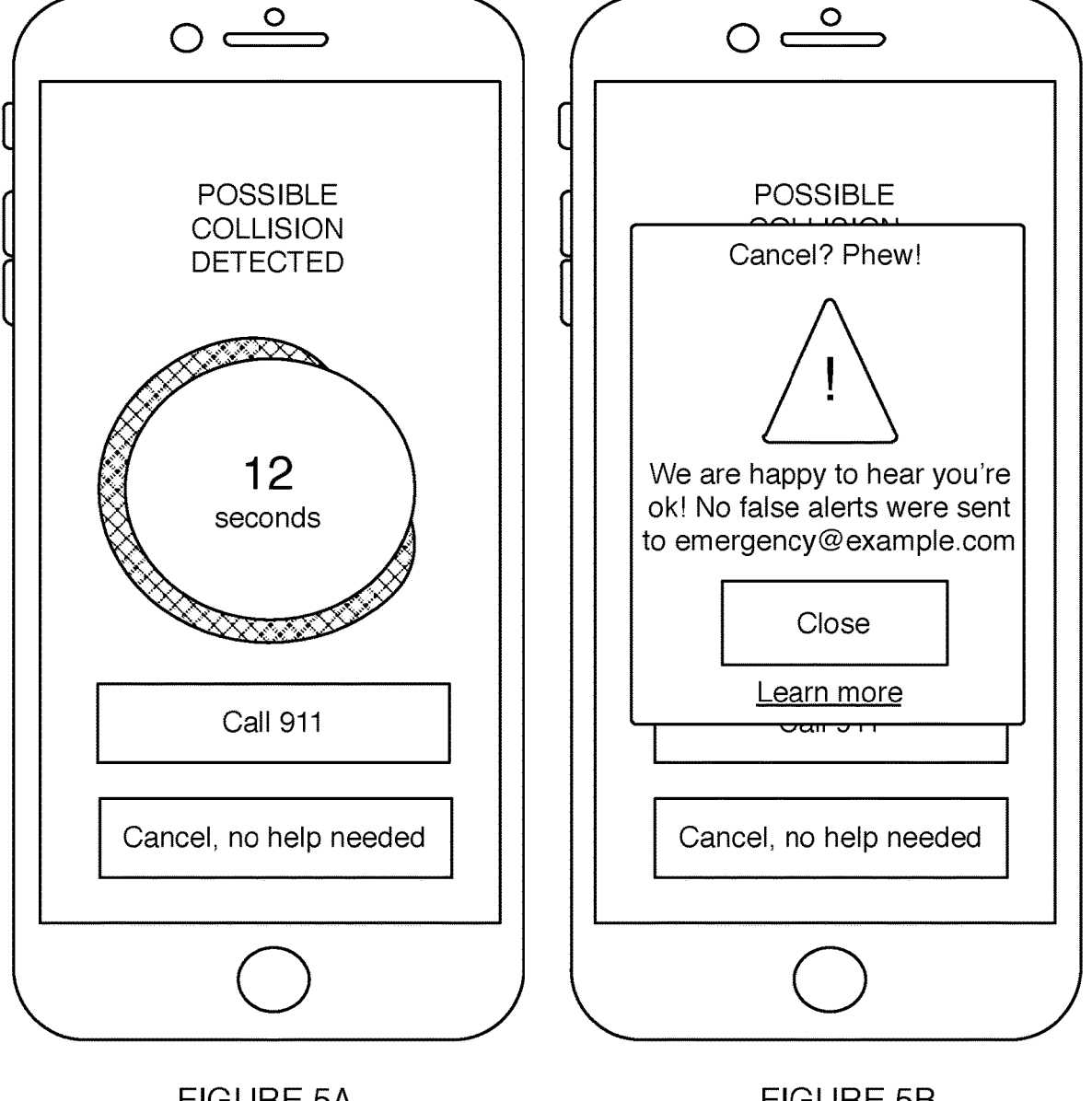
FIGURE 5A                    FIGURE 5B

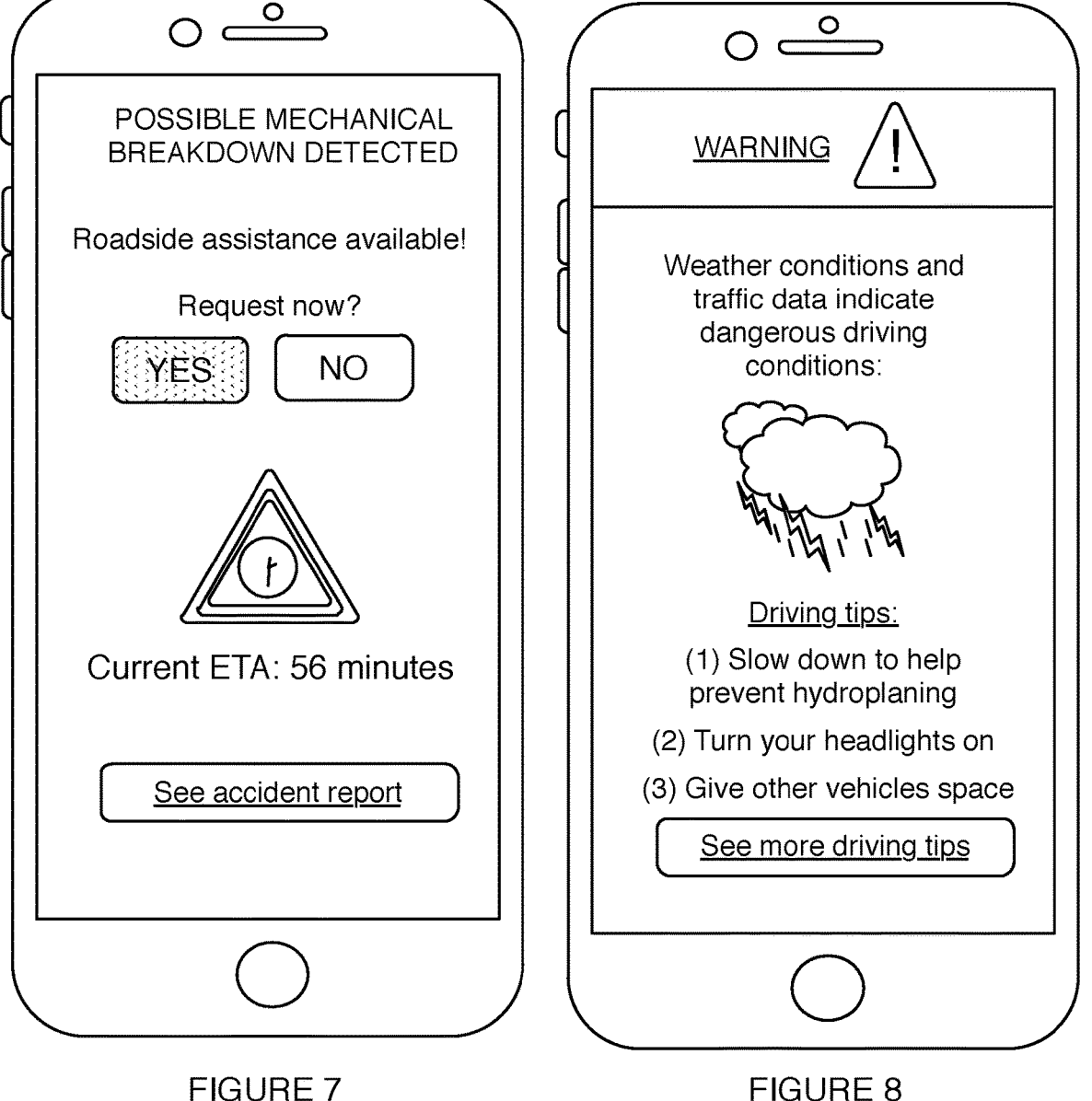
FIGURE 7                    FIGURE 8

METHOD FOR SMARTPHONE-BASED ACCIDENT DETECTION

CROSS-REFERENCE TO RELATED APPLICATIONS

This application is a continuation of U.S. application Ser. No. 17/071,905, filed 15 Oct. 2020, which is a divisional of U.S. application Ser. No. 16/297,178, filed 8 Mar. 2019, now issued as U.S. Pat. No. 10,848,913, which is a continuation of U.S. application Ser. No. 15/492,287, filed 20 Apr. 2017, now issued as U.S. Pat. No. 10,279,804, which claims priority to U.S. application Ser. No. 15/243,565, filed 22 Aug. 2016, now issued as U.S. Pat. No. 9,818,239, which claims the benefit of U.S. Provisional Application Ser. No. 62/207,468 filed 20 Aug. 2015, each of which is incorporated herein in its entirety by this reference.

TECHNICAL FIELD

This invention relates generally to the vehicle telematics field, and more specifically to a new and useful method for smartphone-based accident detection in the vehicle telematics field.

BACKGROUND

Vehicle telematic devices monitor the location, movements, status, and behavior of a vehicle. Such devices commonly use GPS receivers and an electronic device to transmit the collected data. Vehicle telematic devices can additionally include capabilities to interface with signals from the car. Such devices are often purpose-built devices installed in the car or vehicle; however, mobile phones also contain sensing capabilities similar to those of telematic devices and can be used in such a capacity.

Vehicle telematic devices are typically used for functions like navigation and position monitoring, but they can also be used to detect the occurrence of vehicle accidents. Unfortunately, traditional accident detection techniques often fail to take advantage of the numerous sensor data sources available to modern smartphones, and thus are not able to deliver the resolution of detail needed for an ideal response to an accident. Thus, there is a need in the vehicle telematic field to create a new and useful method for smartphone-based accident detection. This invention provides such a new and useful method.

BRIEF DESCRIPTION OF THE FIGURES

FIG. 2 is a flowchart representation of a variation of an embodiment of the method;

FIGS. 5A-5B is a graphical representation of a variation of an accident response action;

FIG. 7 is a graphical representation of a variation of an accident response action;

FIG. 8 is a graphical representation of a variation of an accident response action.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
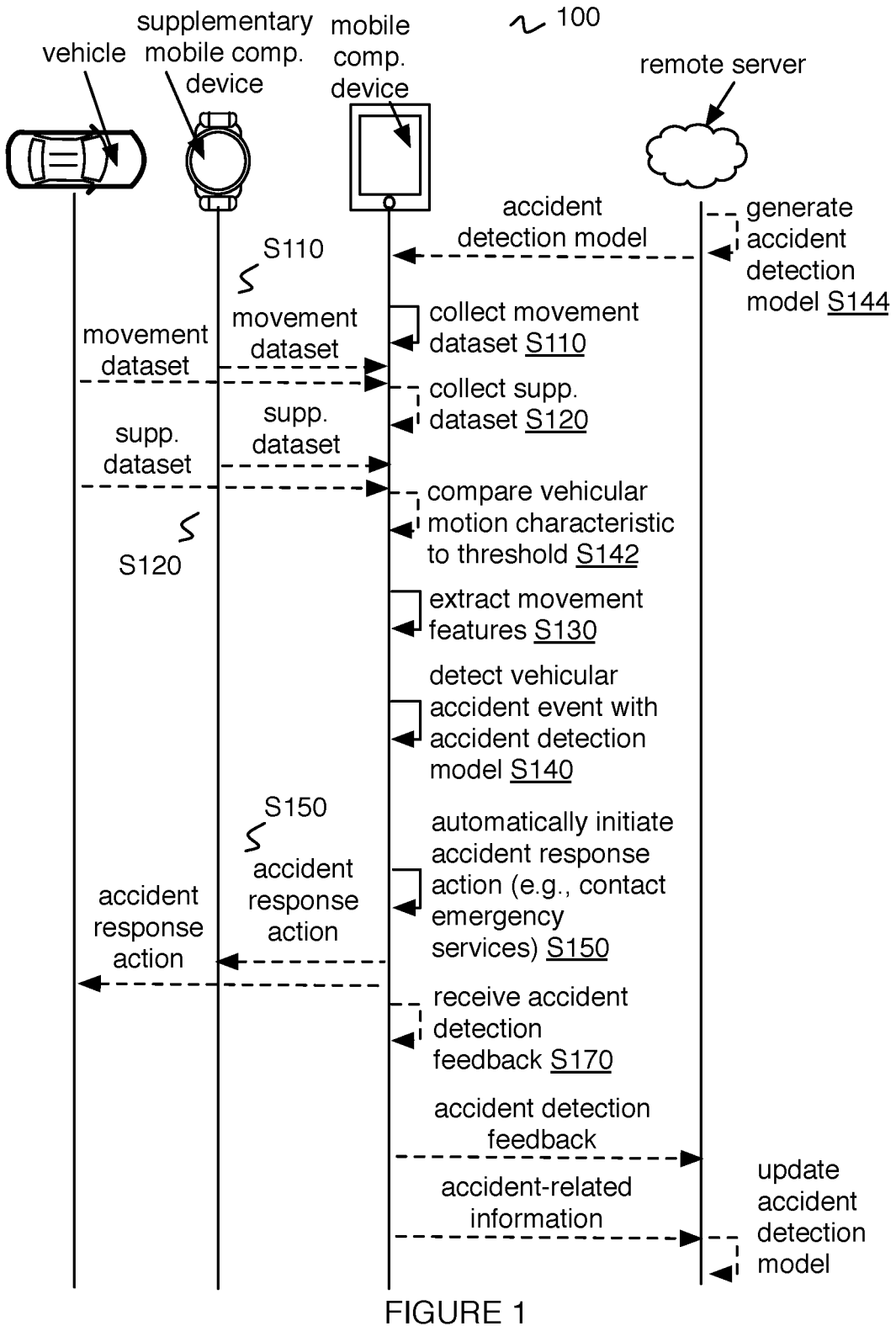
FIG. 1 is a flowchart representation of an embodiment of a method.
Figure 3:
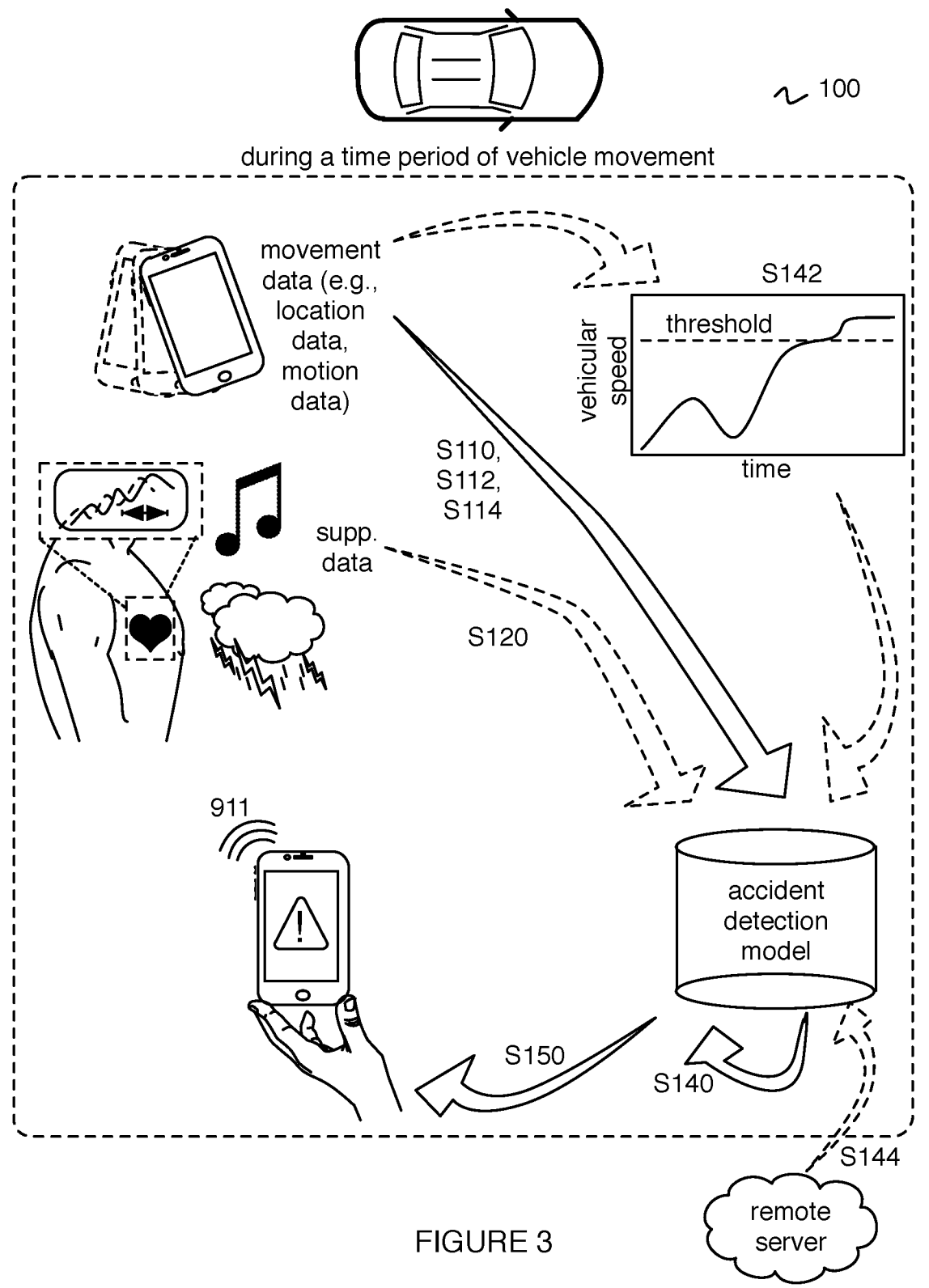
FIG. 3 is a flowchart representation of a variation of an embodiment of the method.

As shown in FIGS. 1-3, an embodiment of a method 100 for detecting an accident of a vehicle includes receiving a movement dataset collected at least at one of a location sensor and a motion sensor arranged within the vehicle, during a time period of movement of the vehicle S110; extracting a set of movement features associated with at least one of a position, a velocity, and an acceleration characterizing the movement of the vehicle during the time period S130; detecting a vehicular accident event from processing the set of movement features with an accident detection model S140; and in response to detecting the vehicular accident event, automatically initiating an accident response action S150.

Additionally or alternatively, the method 100 can include receiving a supplementary dataset configured to supplement the movement dataset S120, determining an accident characteristic associated with the vehicular accident event S160, and/or receiving accident detection feedback S170.

The method 100 functions to enable vehicular accident detection based on movement data (e.g., relating to position, velocity, and/or acceleration) and/or supplemental data. Additionally or alternatively, the method 100 can function to identify one or more accident characteristics characterizing a detected vehicular accident.

The method 100 is preferably implemented on a mobile computing device removably coupled to a vehicle (e.g., a smartphone carried inside a car); the method 100 can additionally or alternatively be implemented by any device (e.g., including the vehicle itself) capable of collecting movement data and supplementary data.

2. Benefits

In specific examples, the method 100 and/or system 200 can confer several benefits over conventional methodologies used for detecting vehicular accidents. In specific examples, the method 100 and/or system 200 can perform one or more of the following:

First, the technology can leverage non-generic location data (e.g., GPS data) and/or motion data (e.g., accelerometer data, gyroscope data) to conveniently and unobtrusively detect vehicular accident events. In examples, the location data and/or motion data can be passively collected at a user's mobile computing device (e.g., a smartphone), such that the technology can perform vehicular accident detection without requiring a user to purchase additional hardware.

Second, the technology can detect vehicular accident events with high accuracy. In examples, the technology can accurately distinguish between collision events (e.g., single-vehicle collisions, multi-vehicle collisions, etc.) and non-collision events (e.g., hard braking, rapid acceleration, etc.), thereby minimizing the detection of false positives. Further, the technology can provide accurate detection while allowing a user to have flexibility in placement of their mobile computing device in relation to the vehicle (e.g., motor vehicles, bicycles, watercraft, aircraft, spacecraft, railed vehicles, etc.). Vehicular accident events can be detected when the mobile computing device collecting movement data is in a user's pocket, in a user's hand, mounted within the car, in a cup holder, and/or in other suitable locations within the vehicle.

Third, the technology can automatically initiate accident response actions in response to detection of a vehicular accident. Accident response actions can include any one or more of notifying emergency services, notifying loved ones, requesting roadside assistance, insurance processing, and/or other suitable accident response actions. Further, in examples, the type of initiated accident response action can be tailored to the particular accident based on movement data and/or supplemental data. In examples, the technology can include a software development kit for third-parties to integrate the accident detection features, thereby enabling third-parties to leverage accident detection for purposes of driving education, ride sharing, valet services, navigation, roadside assistance, insurance processing, emergency services, and/or other services.

Fourth, the technology can detect vehicular accident events in real-time. Prompt transmission of time-sensitive information (e.g., GPS coordinates, vehicular accident characteristics, etc.) to the appropriate entities (e.g., emergency services) can be the differentiator between life and death in serious vehicular accidents.

Fifth, the technology can improve the technical fields of at least vehicle telematics, computational modeling of vehicular accident detection, and vehicular accident detection with mobile computing device data. The technology can continuously collect and utilize non-generic sensor data (e.g., location sensor data, motion sensor data, etc.) to provide real-time accident detection and/or determination of accident characteristics (e.g., severity, accident type, etc.) Further, the technology can take advantage of the non-generic sensor data and/or supplemental data (e.g., vehicle sensor data, weather data, traffic data, biosignal sensor data, etc.) to better improve the understanding of correlations between such data and vehicular accident events, leading to an increased understanding of vehicular-related and driver-related variables affecting vehicular accidents.

Sixth, the technology can provide technical solutions necessarily rooted in computer technology (e.g., utilizing computational models to detect vehicular accidents from non-generic location and/or motion datasets collected at mobile computing devices, etc.) to overcome issues specifically arising with computer technology (e.g., issues surrounding how to leverage movement data collected by a mobile computing device to detect vehicular accidents, and/or to automatically initiate accident response actions for alleviating the harm caused by the vehicular accidents, etc.).

Seventh, the technology can leverage specialized computing devices (e.g., computing devices with GPS location capabilities, computing devices with motion sensor functionality, etc.) to collect specialized datasets for detecting vehicular accidents.

The technology can, however, provide any other suitable benefit(s) in the context of using non-generalized computer systems for detecting one or more vehicular accident events.

3. Method

As shown in FIGS. 1-3, an embodiment of a method 100 for detecting an accident of a vehicle includes receiving a movement dataset collected at least at one of a location sensor and a motion sensor arranged within the vehicle, during a time period of movement of the vehicle S110; extracting a set of movement features associated with at least one of a position, a velocity, and an acceleration characterizing the movement of the vehicle during the time period S130; detecting a vehicular accident event from processing the set of movement features with an accident detection model S140; and in response to detecting the vehicular accident event, automatically initiating an accident response action S150.

In some variations, the method 100 can additionally or alternatively include receiving a supplementary dataset configured to supplement the movement dataset S120, determining an accident characteristic associated with the vehicular accident event S160, and/or receiving accident detection feedback S170.

3.1 Collecting a Movement Dataset.

As shown in FIGS. 1-3, Block S110 recites: receiving one or more movement datasets collected at least at one of a location sensor and a motion sensor arranged within the vehicle, during a time period of movement of the vehicle. Block S110 functions to collect movement-related data for use in detecting one or more vehicular accident events (e.g., in Block S150) and/or for determining one or more vehicular accident characteristics (e.g., in Block S160). Block S110 can additionally or alternatively include collecting a location dataset S112, and/or collecting a motion dataset S114.

Relating to Block S110, movement data preferably refers to any data related to the position, velocity, and/or acceleration of one or more vehicles for which vehicular accident events are to be detected through the method 100. In examples, movement data can include only acceleration data (and not position/velocity data). Movement data can include any one or more of: a location dataset, a motion dataset, and/or any other suitable data related to the position and/or movement of one or more vehicles. Movement data can be collected from and/or associated with any one or more of: motion sensors (e.g., multi-axis and/or single-axis accelerometers, gyroscopes, etc.), location sensors (e.g., GPS data collection components, magnetometer, compass, altimeter, etc.), and/or any other suitable components. Such components are preferably arranged at a mobile computing device (e.g., smartphone, laptop, tablet, smart watch, smart glasses, medical devices, etc.) associated with a user (e.g., a vehicle driver). For example, Block S110 can include receiving one or more movement datasets collected at least at one of a location sensor and a motion sensor arranged within the vehicle, where the location sensor and the motion sensor are arranged at a mobile computing device positioned within the vehicle. Additionally or alternatively, the vehicle can include sensors used in collecting movement data. For example, Block S110 can include collecting a movement dataset at least one of a location sensor and a motion sensor of a vehicle (e.g., a vehicle that is being driven by the user). However, any suitable components associated with any suitable devices can be used in collecting movement data and/or data from which movement data can be derived. For example, S110 can include deriving movement data from visual data (e.g., deriving velocity from video taken by a smartphone's camera) and/or audio data (e.g., deriving motion from Doppler effects captured in data from the smartphone's microphone, etc.), as described in more detail below.

In relation to Block S110, movement data preferably serves as the primary data used in detecting vehicular accident events; additionally or alternatively, movement data can serve as secondary data, or accident detection can not use movement data at all. However, movement data can be used for any suitable purpose.

Block S110 preferably includes collecting movement data whenever the mobile computing device is in a moving vehicle, but can additionally or alternatively include collecting movement data S110 for a stationary vehicle. Block S110 can be include collecting movement data continuously, at specified time intervals (e.g., every minute, every 15 minutes, every half hour, every hour, etc.), in response to satisfaction of conditions (e.g., movement thresholds, supplementary data conditions, etc.) and/or at any suitable time. For example, Block S110 can include receiving a first location dataset collected at a location sensor of a mobile computing device during a first time period of movement of the vehicle; receiving a first motion dataset collected at a motion sensor of the mobile computing device during the first time period; in response to a vehicle motion characteristic (e.g., extracted from at least one of the first location dataset and the first motion dataset) exceeding the motion characteristic threshold: receiving a second location dataset collected at the location sensor of the mobile computing device during a second time period of the movement of the vehicle, where the second time period is after the first time period, and receiving a second motion dataset collected at the motion sensor of the mobile computing device during the second time period.

For Block S110, movement data is preferably associated with one or more temporal indicators (e.g., a time point, a time window, a time period) describing when the movement data was collected. However, movement data can be correspond to any suitable temporal indicator or be time-independent.

In a variation, Block S110 can include collecting movement data at multiple devices associated with a user and/or vehicle. For example, Block S110 can include collecting a first movement dataset at least at one of a location sensor and a motion sensor of mobile computing device positioned within a moving vehicle, and receiving a second movement dataset collected at least at one of a location sensor and a motion sensor of the moving vehicle. Multiple sources of movement data can be used to reduce noise, fill gaps of movement data during a time period, and/or increase confidence levels associated with detecting vehicular accident events and/or determining vehicular accident characteristics. For example, the method 100 can include reducing noise by combining (e.g., averaging) multiple sources of movement data. Movement datasets from multiple sources can be collected at the same type of device (e.g., a first and a second smart phone positioned within the vehicle), or different types of devices (e.g., a smart phone and a vehicle). Additionally or alternatively, collecting movement data at multiple devices can be performed in any suitable fashion.

However, collecting movement data S110 can be performed in any suitable manner.

3.1.A Movement Data—Collecting a Location Dataset.

As shown in FIG. 3, Block S110 can additionally or alternatively include Block S112, which recites: receiving a location dataset collected at a location sensor associated with a vehicle during a time period. Block S112 functions to collect location-related data for use in detecting one or more vehicular accident events (e.g., in Block S140) and/or for determining one or more vehicular accident characteristics (e.g., in Block S160).

Relating to Block S112, a location dataset can include any one or more of: GPS data (e.g., position coordinates, associated time stamps, etc.), indoor positioning system data, local positioning system data, multilateration data, GSM localization data, self-reported positioning, control plane locating data, compass data, magnetometer data, and/or any other suitable location-related data. Collecting a location dataset S112 preferably includes collecting GPS data from a GPS receiver of a mobile computing devices. GPS data preferably includes complete position, velocity, time (PVT) solutions, but can additionally or alternatively include any movement data retrieved using GNSS data (e.g., via GLONASS, Galileo, BeiDou). For example, velocity data is preferably collected directly from the GPS PVT solution, but can additionally or alternatively be derived from change in position over time (i.e., average velocity). GPS data can additionally or alternatively be used as a source of acceleration data (as derived from change in velocity over time). However, any suitable movement data can be determined from GPS data.

For Block S112, collecting a location dataset preferably includes collecting GPS data according to a mobile computing device operating state. Operating states preferably dictate how GPS data is collected, including data collection frequency, GPS receiver power state, etc. For example, Block S112 can include collecting GPS data when necessary for accident detection purposes, while disabling the GPS receiver when GPS data collection is not necessary. Additionally or alternatively, GPS data can be used for multiple reasons (e.g., for both navigation and accident detection purposes), in these cases, GPS data can be collected whenever desired for any purpose. For example, GPS data can be collected and used for accident detection (even if other sources of movement data are available) anytime it is already being collected for another purpose. However, Block S112 can include collecting GPS data based on any suitable criteria.

In relation to Block S112, mobile computing device operating states (as they pertain to GPS data collection) can be set based on any input data. For example, Block S112 can include collecting GPS data differently depending on navigation system state (e.g., battery charge level, charging status), time of day, location, route knowledge (e.g., how much data has been collected about the current route and/or position), GPS signal quality, and/or any other suitable data.

However, collecting a location dataset S112 can be performed in any suitable fashion.

3.1.B Movement Data—Collecting a Motion Dataset.

As shown in FIG. 3, Block S110 can additionally or alternatively include Block S114, which recites: receiving a motion dataset collected at a motion sensor associated with a vehicle during a time period. Block S114 functions to collect motion-related data for use in detecting one or more vehicular accident events (e.g., in Block S140) and/or for determining one or more vehicular accident characteristics (e.g., in Block S160).

Relating to Block S114, a motion dataset can include any one or more of: accelerometer data (e.g., single-axis data, multi-axis data), gyroscope data (e.g., single-axis data, multi-axis data), velocity data (e.g., speed, instantaneous velocity, average velocity, change in velocity, velocity variability over time, maximum velocity, minimum velocity, etc.), acceleration data (e.g., instantaneous acceleration, gravitational acceleration, average acceleration, change in acceleration, acceleration variability over time, maximum acceleration, minimum acceleration, etc.), displacement data, orientation data, rotation data, turning data, and/or any other suitable motion-related data. For example, gravitational acceleration can be used to measure one or more free fall parameters (e.g., entering a free fall state, exiting a free fall state, duration of free fall, etc.) before, during, and/or after a vehicular accident event. Free fall parameters of a motion dataset can indicate that a mobile computing device has been dropped, is in mid-air (e.g., in response to a vehicular accident event), and/or has moved in any other manner.

Block S114 preferably includes collecting movement data using one or more accelerometers (i.e., collecting accelerometer data). Accelerometer data is preferably used as a source of acceleration data. For example, Block S114 can include deriving acceleration data from a motion dataset collected at an accelerometer of a mobile computing device.

In variations, Block S114 can include collecting a motion dataset at an accelerometer of a mobile computing device during a time period, and deriving at least one of position data and velocity data from the motion dataset for the time period. Accelerometer data is preferably used as a source of position data by comparing accelerometer patterns to a map reference with known patterns (e.g., road surface vibration patterns, as measured by the accelerometer, correlate to a specific stretch of road), but can additionally or alternatively be used to derive or estimate position data in any manner.

In relation to Block S114, accelerometer data is preferably collected according to a navigation system state, but can additionally or alternatively be collected in any manner.

Additionally or alternatively, Block S114 can include any elements described in U.S. patent application Ser. No. 15/243,513, filed 22 Aug. 2016, now issued as U.S. Pat. No. 9,733,089 and entitled "Method for Accelerometer-Assisted Navigation," the entirety of which is incorporated by this reference.

However, collecting a motion dataset S114 can be performed in any suitable fashion.

3.2 Collecting Supplementary Data.

As shown in FIGS. 1-3, Block S120 recites: collecting supplementary data during a time period at one or more devices associated with the user. Block S120 functions to collect data that can be used to filter, control for errors in, and/or otherwise supplement movement data collected in Block S110.

In relation to Block S120, supplementary data can include any one or more of: audio data (e.g., collected in Block S121), video data (e.g., collected in Block S122), vehicle sensor data (e.g., collected in Block S123), remote movement data (e.g., collected in Block S124), biosignal data (e.g., collected in Block S125), environmental data (e.g., collected in Block S126), traffic data (e.g., collected in Block S127), contextual data (e.g., collected in Block S128), and/or any other suitable data for detecting one or more vehicular accident event and/or determining one or more vehicular accident characteristics. Block S120 preferably includes collecting supplementary data at a mobile computing device used to collect movement data (e.g., in Block S110), but can additionally or alternatively include collecting supplementary data at a device distinct from the mobile computing device used to collect movement data. In a variation, Block S120 can include collecting supplementary data across a plurality of devices, where the supplementary data can be combined and/or otherwise processed in Block S130.

Block S120 preferably includes passively collecting supplementary data (e.g., without requiring human intervention), but can additionally or alternatively include actively collecting supplementary data (e.g., from presenting a digital survey to the user at the mobile computing device, etc.). In a specific example, Block S120 can include prompting, at an application executing on the mobile computing device, the user to input vehicle model information.

Block S120 can include collecting supplementary data at any suitable time before, during, and/or after a vehicular accident event. In a variation, Block S120 can include collecting supplementary data in response to determining an unsafe driving conditions status (e.g., from movement data, from other supplementary data, etc.). In another variation, Block S120 can include collecting supplementary data in response to detecting a vehicular accident event. For example, Block S120 can include capturing image data and/or video data of vehicles (e.g., license plates) involved in the vehicular accident event, which can be used to facilitate insurance processing and/or other suitable purposes.

Relating to Block S120, supplementary data is preferably associated with a temporal indicator that is the same and/or overlapping with a temporal indicator associated with movement data (e.g., collected in Block S110). For example, the method 100 can include collecting a movement dataset at a mobile computing device during a time period, and collecting a supplementary dataset at the mobile computing device during the time period. Additionally or alternatively, the supplementary data can be associated with a temporal indicator distinct from temporal indicators associated with movement data, but can otherwise be time independent.

However, collecting supplementary data S120 can be performed in any suitable manner.

3.2.A Supplementary Data—Collecting Audio Data.

In a variation, Block S120 can optionally include Block S121, which recites: collecting audio data. Block S121 preferably includes collecting audio data that can be used to detect that an accident has occurred and/or the severity of an accident (e.g., by analyzing recorded audio for sounds related to or resulting from impacts). For example, audio data can provide information on the status of a vehicle before/during/after an accident (e.g., by recording engine noise), the nature, location, and/or severity of an accident (e.g., by recording impact noise), and the effect of the accident on the vehicle's occupants (e.g., by recording voice data for a vehicle's occupants). In another example, Block S121 can include recording airbag deployment audio data, and detecting a vehicular accident event and/or determining an vehicular accident characteristic based on the airbag deployment audio data, any other suitable audio data, and/or movement data.

Block S121 preferably includes collecting audio data via one or more microphones located in the mobile computing device, but can additionally or alternatively collect audio data from any source (e.g., a vehicle microphone coupled to the mobile computing device via Bluetooth).

In a variation, Block S121 includes collecting audio data via recorded gyroscope signals (e.g., as described in "Gyrophone: Recognizing Speech From Gyroscope Signals", by Yan Michalevsky, Dan Boneh, and Gabi Nakibly, published in the 23$^{rd}$ Usenix Security Symposium, the entirety of which is incorporated by this reference).

However, collecting audio data S121 can be performed in any suitable fashion.

3.2.B Supplementary Data—Collecting Video Data.

In a variation, Block S120 can optionally include Block S122, which recites: collecting video data. Block S122 preferably includes collecting video data that can be used to detect that an accident has occurred and/or the severity of an accident (e.g., by analyzing video to determine how far the mobile computing device was moved during an accident). For example, video data can provide information on the status of a vehicle before/during/after an accident (e.g., by recording visuals of the vehicle's exterior), the nature, location, and/or severity of an accident (e.g., by recording visuals of an impact site), and the effect of the accident on the vehicle's occupants (e.g., by recording video data of a vehicle's occupants).

Block S122 preferably includes collecting video data via one or more cameras located in the mobile computing device, but can additionally or alternatively collect video data from any source (e.g., a backup camera of the vehicle accessible to the navigation device).

However, collecting video data S122 can be performed in any suitable fashion.

3.2.C Supplementary Data—Vehicle Sensor Data.

In a variation, Block S120 can optionally include Block S123, which recites: collecting vehicle sensor data. Vehicle sensor data can include any one or more of: proximity sensor data (e.g., radar, electromagnetic sensor data, ultrasonic sensor data, light detection and ranging, light amplification for detection and ranging, line laser scanner, laser detection and ranging, airborne laser swath mapping, laser altimetry, sonar, etc.), vehicle camera data (e.g., in-car cameras, exterior cameras, back-up cameras, dashboard cameras, front-view cameras, side-view cameras, image recognition data, infrared camera, 3D stereo camera, monocular camera, etc.), car speed, RPM data, odometer, altimeter, location sensor data (e.g., GPS data, compass data, etc.), motion sensor data (e.g., from an accelerometer, gyroscope, etc.), environmental data (e.g., pressure, temperature, etc.), light sensor data (e.g., from infrared sensors, ambient light sensors, etc.), fuel level (e.g., percentile-based, distance-based, low warning, etc.), fuel system status, oxygen sensor data, throttle position, gear data (e.g., drive, neutral, park, reverse, gear number, etc.), HVAC data (e.g., current temperature, target temperature, etc.), driving status (e.g., restricted features such as user inputs into control panel, unrestricted features, etc.), and/or any other suitable vehicle data. For example, vehicle sensor data can provide information on the status of a vehicle before/during/after an accident (e.g., by collecting airbag deployment data, ABS or other braking system data, engine temperature data, etc.). For example, Block S123 can include receiving a proximity dataset collected at a proximity sensor of the vehicle.

Block S123 can include collecting vehicle sensor data (e.g., vehicle subsystem status data) via the vehicle's on-board diagnostics (OBD) port. For example, Block S123 can include using OBD-II Parameter IDs to request OBD data from a vehicle. In another example, Block S123 can include detecting deployment of an airbag through a communicable link with a vehicle. However, collecting vehicle sensor data through the OBD system can be performed in any manner.

However, collecting vehicle sensor data S123 can be performed in any suitable fashion.

3.2.D Supplementary Data—Collecting Remote Movement Data.

In a variation, Block S120 can optionally include Block S124, which recites: collecting remote movement data. Block S124 preferably includes collecting movement data from one or more mobile computing devices proximal a mobile computing device implementing Block S110. For example, Block S124 can include collecting remote movement data from other smartphones in the vehicle, smartphones in nearby vehicles, etc. Remote movement data is preferably used to aid in performing accident detection through comparison of local movement data (i.e., movement data captured in Block S110) and remote movement data. For example, if local movement data appears to indicate that an accident has occurred, but remote data from a number of nearby sources does not appear to support the accident detection, this can indicate that the local movement data is not trustworthy.

Block S124 preferably includes collecting remote movement data via wireless data connections of the mobile computing device (e.g., LTE internet on a smartphone) but can additionally or alternatively include collecting remote movement data in any manner.

Block S124 can include collecting remote movement data from mobile computing devices (or other sources) when remote movement data sources are within some range (e.g., 100m). Additionally or alternatively, Block S124 can include collecting remote movement data selectively based on any criteria (e.g., only collecting remote movement data from vehicles traveling in the same direction as the vehicle with the navigation device operating the method 100), but remote movement data can be collected at any suitable time.

However, collecting remote movement data S124 can be performed in any suitable fashion.

3.2.E Supplementary Data—Collecting Biosignal Data.

In a variation, Block S120 can optionally include Block S125, which recites: collecting biosignal data. Biosignal data can include any one or more of: cardiovascular parameters (e.g., instantaneous blood pressure, blood pressure variability, instantaneous heart rate, heart rate variability, average heart rate, resting heart rate, heartbeat signature, pulse rate metrics, etc.), bioelectrical signal data (e.g., electrooculography, electromyography, electrocardiography galvanic skin response, magnetoencephalogram, etc.), sleep metrics (e.g., amount of sleep, types of sleep, etc.), respiration data (e.g., respiration rate, depth of breath, shallowness of breath, inhalation-to-exhalation ratio, thoracic variations, tidal volume, inspiratory flow, expiratory flow, work of breathing, phase angle, respiratory waveform morphology, etc.), data regarding analytes detectible in biological fluids (e.g., blood, sweat, interstitial fluid, chime, saliva, serum, etc.) and/or any other suitable biosignal data. Block S125 can include collecting biosignal data at any one or more of: medical devices (e.g., therapeutic devices, monitoring devices, etc.), mobile electronic devices with biosignal data collection functionality (e.g., smart watch with cardiovascular monitoring capabilities, etc.), and/or any other suitable biosignal data collector.

In an example, Block S125 can include measuring, at a fitness monitoring device coupled to the vehicle driver, a blood pressure parameter of the vehicle driver during a time period in which movement data is collected. In this example, an unusually high blood pressure (e.g., relative an average blood pressure for the driver during other driving sessions) can indicate a driver's inability to focus, which can be correlated with a higher probability of vehicular accident. In another example, Block S125 can include: in response to detecting a vehicular accident event, measuring a heart rate parameter of the vehicle driver at a smart watch coupled to the vehicle driver. In this example, measuring an average heart rate that is comparable to the driver's average resting heart rate can indicate driving conditions familiar to the driver, which can be correlated with a lower probability of vehicular accident.

However, collecting biosignal data S125 can be performed in any suitable fashion.

3.2.F Supplementary Data—Collecting Environmental Data.

In a variation, Block S120 can optionally include Block S126, which recites: collecting environmental data. Environmental data can include any one or more of: weather conditions (e.g., weather forecast, temperature, humidity, precipitation, wind, etc.), road conditions (e.g., road closure, road opening, number of road lanes, road deterioration, etc.), pressure conditions (e.g., ambient pressure, etc.), air quality (e.g., pollution levels, etc.), and/or other suitable environmental data. In an example, a weather forecast describing thunderstorms proximal the driver's location (e.g., derived from a location dataset collected in Block S112, etc.) can indicate a higher likelihood of a vehicular accident event. In another example, road conditions indicating a single-lane freeway, analyzed along with a motion dataset describing a vehicular speed in excess of the freeway speed limit, can indicate a greater chance of occurrence of a vehicular accident event.

However, collecting environmental data S126 can be performed in any suitable fashion.

3.2.G Supplementary Data—Collecting Traffic Data.

In a variation, Block S120 can optionally include Block S127, which recites: collecting traffic data. Traffic data can include any one or more of: accident data (e.g., number of accidents within a predetermined radius of the user, accident frequency, accident rate, types of accidents, frequency of accidents, etc.), traffic level, traffic laws (e.g., speed limit, intersection laws, turning laws), traffic lights, type of vehicular path (e.g., freeway, intersection, etc.), and/or other suitable traffic data.

In an example, Block S127 can include querying a traffic information database (e.g., traffic accident tracker) with GPS coordinate inputs; and receiving a traffic report for a location proximal the vehicle location. In another example, higher amounts of traffic proximal the vehicle location can indicate a higher likelihood of a multi-vehicle collision. In another example, a vehicle driver violating traffic laws (e.g., turning left at an intersection prohibiting left turns) can indicate a higher likelihood of a particular vehicle accident type (e.g., a T-bone collision).

However, collecting traffic data S127 can be performed in any suitable fashion.

3.2.H Supplementary Data—Collecting Contextual Data.

In a variation, Block S120 can optionally include Block S128, which recites: collecting contextual data. Contextual data can include any one or more of: temporal data (e.g., time of day, date, etc.), driver data, mobile electronic device usage (e.g., driver texting, usage of smartphone while driving, etc.), vehicle model data (e.g., model, age, accident history, mileage, repair history, etc.), light sensor data (e.g., associated with a user's mobile electronic device, etc.), and/or any other suitable contextual data.

In an example, Block S128 can include collecting driver behavior data (e.g., actively collected driver data, derived from movement data, etc.), which can be used to adjust and/or select one or more accident detection models tailored to a given driver. Additionally or alternatively, Block S128 can include any elements described in U.S. application Ser. No. 14/566,408 filed 10 Dec. 2014 and entitled "System and Method for Assessing Risk through a Social Network," and U.S. application Ser. No. 14/206,721 filed 12 Mar. 2014 and entitled "System and Method for Determining a Driver in a Telematic Application," which are each hereby incorporated in their entirety by this reference.

In another example, Block S128 can include collecting temporal data indicating the time of day when a driving session is occurring. For example, a higher risk of vehicular accident can be correlated with temporal data indicating a driving session at a time when the driver does not usually drive. In another example, mobile computing device usage by the driver during the driving session (e.g., texting while driving) can provide insight into driver behaviors affecting the likelihood of a vehicular accident. In another example, the method 100 can include collecting a light dataset from a light sensor of the mobile computing device; determining a position of the mobile computing device in the vehicle (e.g., in a user's pocket, being held, mounted, in a cup holder, in a passenger seat, etc.); and selecting an accident detection model from a set of accident detection models, based on the position of the mobile computing device.

However, collecting contextual data S128 can be performed in any suitable fashion.

3.3 Processing Movement Data and/or Supplementary Data

As shown in FIGS. 1-2, Block S130 recites: processing at least one of a movement dataset and a supplementary dataset. Block S130 functions to process data collected at least in one of Block S110 and Block S120 for detecting one or more vehicular accident events.

Processing data can include any one or more of: extracting features, performing pattern recognition on data, fusing data from multiple sources, combination of values (e.g., averaging values, etc.), compression, conversion (e.g., digital-to-analog conversion, analog-to-digital conversion), wave modulation, normalization, filtering, noise reduction, smoothing, model fitting, transformations, mathematical operations (e.g., derivatives, moving averages, etc.), multiplexing, demultiplexing, and/or any other suitable processing operations. For example, Block S130 can include associating different data (e.g., different data types, same data type collected at different sources, etc.) based on a common and/or overlapping temporal indicator (e.g., time point, time window, time period, etc.), which can enable data collected from multiple sources during a common temporal indicator to be processed and/or analyzed together (e.g., for detecting a vehicular accident event during the temporal indicator. In another example, Block S130 can include measuring sensor data oscillation periods; in many cases, measurement 'ringing' (i.e., oscillation around some value) can be higher magnitude or sustained for a longer period of time for larger impacts. Therefore, measurements of ringing magnitude and/or duration can be used to generate impact estimates.

Block S130 preferably includes extracting a one or more movement features from at least one of a movement dataset and a supplementary dataset, but movement features can be derived from any suitable data. Movement features are preferably associated with at least one of a position, a velocity, and an acceleration characterizing the movement of the vehicle during a time period. Movement features can include any one or more of: raw movement data (e.g., raw location data, raw motion data, etc.), processed movement data (e.g., through a processing operation described above), movement profiles (e.g., driving profile, braking profile, position profile, speed profile, acceleration profile, turning profile, etc.), identified driving actions (e.g., parking, acceleration, braking, short following, lane-departure, freewheeling, U-turn, left turn, right turn, over-revving, stationary vehicle, moving vehicle, etc.), vehicle motion characteristics (e.g., determined in Block S142), and/or any other suitable features.

For example, Block S130 can include calculating a vehicle braking profile and/or stopping distance from movement data (and/or from supplementary data). A vehicle braking profile can be calculated from vehicle deceleration over time. Stopping distance can be calculated from distance traveled between initiation of deceleration and a vehicle stopping. In another example, Block S130 can include identify or estimating an acceleration feature describing changes in vehicle acceleration (e.g., for use in determining an accident severity score in Block S160). In another example, Block S130 can include deriving movement features from image and/or video analysis of media captured by one or more cameras associated with the vehicle (e.g., mobile computing device cameras, vehicle cameras, etc.). In another example, Block S130 can include extracting driving profile features (e.g., describing driver behavior) from interpreting speech recorded by microphones of the navigation device; speech can be interpreted based on meaning (e.g., driver behavior can be detected based on what people say) and/or emotion (e.g., driver behavior can be detected based on identified emotions). In another example, Block S130 can include extracting a vertical vehicular motion feature (e.g., from vertical accelerometer data) describing motion of the vehicle perpendicular a road surface.

Additionally or alternatively, Block S130 can include extracting one or more supplemental features (e.g., weather features, traffic features), from one or more supplemental datasets (e.g., a weather dataset, a traffic dataset). For example, Block S130 can include deriving a mobile computing device location feature within the vehicle (e.g., in pocket, on a seat, on dashboard, on a car mount mobile computing device holder, held in a hand, etc.) from processing mobile computing device light sensor data, camera data (e.g., image recognition processing operations on in-vehicle camera data) and/or other suitable data, but any suitable features can be extracted from any suitable data.

Figure 9:
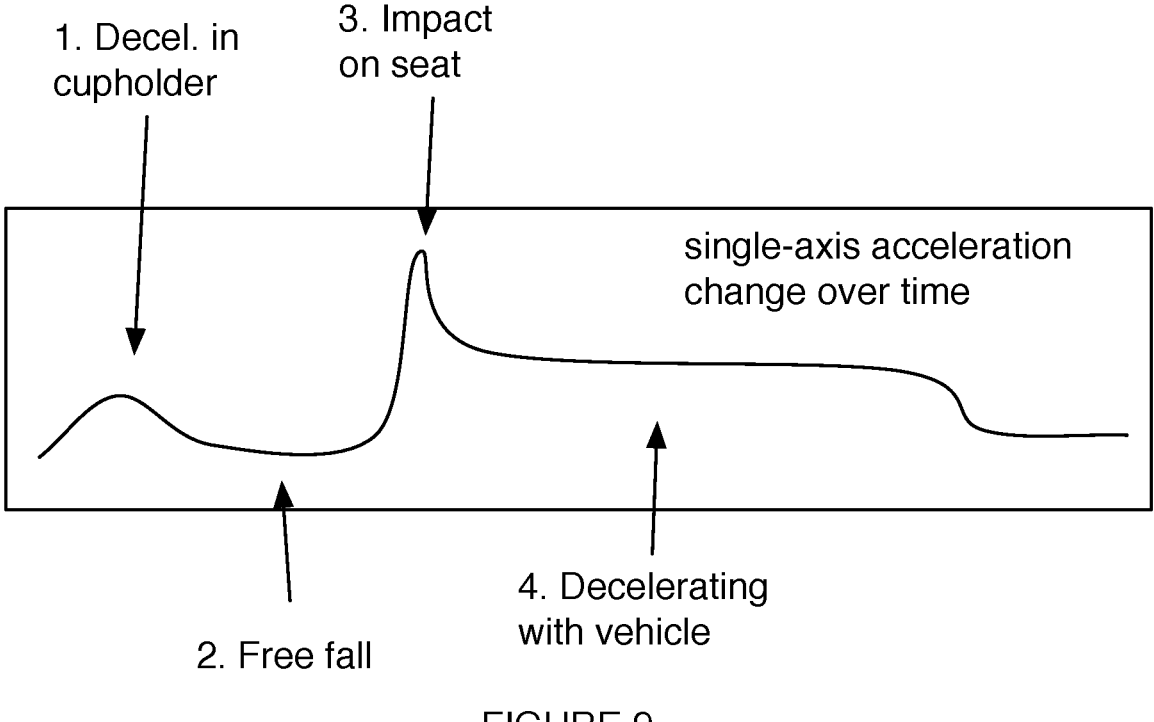
FIG. 9 is an example representation of acceleration profiles of a variation of an embodiment of the method.

Block S130 can include filtering data from at least one of a movement dataset and a supplementary dataset. Movement and supplementary data can be filtered using both independent filters (i.e., filters operating on data from a single source) and joint filters (i.e., filters operating on data from multiple sources). In an example, accelerometer readings from the navigation device can be filtered according to expected impact patterns. As shown in FIG. 9, a small change in acceleration followed by a very quick (but high magnitude) spike in acceleration and then a longer, lower magnitude acceleration reading can be indicative of braking causing a phone to fly out of a cup holder, and then land in a seat. Filtering can be important in this case as the first three sections of the acceleration profile are indicative of navigation device motion independent of vehicle motion, which can be useful for accident detection.

Relating to Block S130, in an example of a joint filter, GPS data can be filtered based on accelerometer data. If GPS data indicates a sudden change in velocity, but that change in velocity is not reflected in accelerometer readings, the GPS data can be flagged as untrustworthy data. In another example, Block S130 can include operating a Kalman filter on accelerometer and microphone data to identify correlations between the two datasets (which can be used to identify accidents).

Block S130 can include processing any available data (e.g., behavior models built into the navigation system, a database of known data profiles stored in the cloud, learned patterns derived from system behavior during normal non-accident operation periods, etc.).

However, processing at least one of a movement dataset and a supplementary dataset can be performed in any suitable manner.

3.4 Detecting a Vehicular Accident Event.

As shown in FIGS. 1-3, Block S140 recites: detecting one or more vehicular accident events from processing a set of movement features with an accident detection model. Block S140 functions to identify one or more accidents involving one or more vehicles. As shown in FIG. 3, Block S140 can additionally or alternatively include performing threshold satisfaction tests S142, and/or generating an accident detection machine learning model S144.

Vehicular accident events can include: collisions (e.g., single-vehicle collisions, multi-vehicle collisions, pedestrian collisions, etc.), vehicle failures (e.g., mechanical breakdowns, electrical failures, software failures, issues with battery, wheel change, fuel, puncture, charging, clutch, ignition, cooling, heating, ventilation, brakes, engine, etc.), and/or any other suitable type of vehicular accident. Vehicular accident events can be detected for any type of vehicle(s) involved in an accident (e.g., motor vehicles, bicycles, watercraft, aircraft, spacecraft, railed vehicles, etc.), possessing any suitable vehicle characteristics (e.g., size, form, construction, materials, etc.), but vehicular accident events can include any suitable accident-related events.

Block S140 preferably includes detecting a vehicular accident event based on the set of movement features. For example, Block S140 can include detecting a vehicular accident event from processing the set of movement features with an accident detection model. In another example, Block S140 can include detecting a vehicular accident event with the accident detection model and at least one of a location dataset and a motion dataset (e.g., a location dataset and motion dataset received in response to satisfaction of a comparison to a threshold in Block S142). In another example, Block S142 can include detecting a vehicular accident event from processing a vertical vehicular motion feature with the accident detection model.

Additionally or alternately, Block S142 can include detecting a vehicular accident event based on supplemental data. For example, the method 100 can include receiving a traffic dataset describing traffic conditions proximal a vehicle location extracted from the second location dataset, where the traffic conditions include at least one of: a traffic level, a traffic law, and accident data; and detecting a vehicular accident event with the accident detection model, the traffic dataset, and a movement dataset (e.g., a location dataset, a motion dataset, etc.). In another example, the method 100 can include receiving a weather dataset associated with a vehicle location extracted from a movement dataset, where the weather dataset indicates weather conditions proximal the vehicle location during a time period (e.g., the time period in which the movement dataset was collected); and detecting the vehicular accident event from processing the weather dataset and a set of movement features (e.g., extracted from the movement dataset) with the accident detection model. In another example, the method 100 can include receiving a proximity dataset collected at a proximity sensor of the vehicle; extracting a set of proximity features describing an object physically proximal the vehicle; and detecting a vehicular accident event from processing the set of proximity features and the set of movement features with the accident detection model. In another example, the method 100 can include receiving an audio dataset collected at a microphone of the mobile computing device; receiving a biosignal dataset collected at a biosignal monitoring device coupled to a driver of the vehicle; receiving a weather dataset describing weather conditions proximal a vehicle location extracted from the first movement dataset; receiving a traffic dataset describing traffic conditions proximal the vehicle location; receiving a vehicular gear dataset describing gear status of the vehicle; and detecting one or more vehicular accident events from processing the audio dataset, the biosignal dataset, the weather dataset, the traffic dataset, the vehicular gear dataset, the set of movement features, and the set of proximity features with the accident detection model.

In a variation, Block S140 can include generating a comparison between movement-related data (e.g., a movement dataset, movement features, vehicle motion characteristics extracted in Block S142, etc.) and one or more accident detection thresholds. Detecting an accident can be in response to exceeding, being below, and/or being at an accident detection threshold, and/or in response to satisfaction of any suitable accident detection threshold condition. Accident detection thresholds can include any one or more of: a threshold change in position (e.g., change in latitude, longitude, altitude, etc.), change in velocity, change in acceleration, supplemental data thresholds (e.g., weather precipitation threshold, traffic level threshold, etc.), and/or any suitable threshold. An accident detection threshold preferably indicates a threshold to be reached within an amount of time, which can be predetermined (e.g., manually by a human, automatically through a computational model), dynamic (e.g., based on supplemental information), and/or otherwise determined. For example, Block S140 can include generating a comparison between a vehicular speed motion characteristic and a vehicular speed accident detection threshold of a change in speed of 40 MPH in less than 2 seconds. Alternatively, the accident detection threshold can be time independent.

In this variation, Block S140 can include dynamically adjusting an accident detection threshold based on at least one of movement-related data and/or supplemental-related data. For example, Block S140 can include dynamically adjusting an accident detection threshold of change in speed based on weather conditions (e.g., reducing the threshold change in speed of 40 MPH in less than 2 seconds to 35 MPH in less than 3 seconds based on a high precipitation forecast). In another example, Block S140 can include dynamically increasing a change in acceleration accident detection threshold in response to retrieving traffic level supplemental data indicating light traffic at a location proximal the vehicle.

In another variation, Block S140 can include generating a comparison with one or more reference profiles. Reference profiles can include accident reference profiles (e.g., movement profiles and/or supplemental profiles indicative of a vehicular accident event), non-accident reference profiles, and/or any other suitable reference profiles for illuminating the presence of a vehicular accident event. One or more reference profiles are preferably compared to movement-related data collected for a user driving the vehicle, but can additionally or alternatively be compared to supplemental-related data. In an example, Block S140 can include generating a comparison between an expected non-accident reference profile for a large vehicle performing a sharp U-turn and movement-related data collected for a commercial truck performing a sharp U-turn. In this example, Block S140 can include detecting a vehicular accident event in response to a similarity score (e.g., between the reference profile and the movement-related data) below a similarity score threshold.

In examples of this variation, Block S140 can include matching patterns between one or more reference profiles and at least one of movement-related data and supplemental-related data. For example, Block S140 can include processing movement and/or supplemental data with an accident detection machine learning model (e.g., in Block S144). For example, Block S140 can include comparing accelerometer data to known impact profiles or impact models. Block S140 can also include comparing modeled results to typical results for data types; for example, stopping distance can be compared to a typical emergency stopping distance for a vehicle. If measured stopping distance is significantly shorter than the typical emergency stopping distance, that can be an indication that an accident has occurred. As an example of joint pattern recognition, Block S1340 can process movement data and microphone data simultaneously to determine potential impacts (e.g., for impact to be detected, an impact noise can need to be detected within a certain time period of a rapid acceleration change). However, generating a comparison with a reference profile can be performed in any suitable manner.

In another variation, Block S140 can include mapping out a decision tree with decision nodes, chance nodes, and/or end nodes describing accident detection actions (e.g., selecting a machine learning model to retrieve, collecting additional data, etc.) to take in response to different events. However, generating a decision tree can be performed in any suitable manner.

In another variation, Block S140 can include dynamically adjusting an accident detection threshold, accident detection model, and/or a reference profile based on the source of movement data (e.g., collected in Block S110). For example, Block S140 can include retrieving a collision reference profile tailored for comparison to movement data collected from a mobile computing device positioned at a device mount within the vehicle (e.g., versus an unrestrained mobile computing device positioned on top of the passenger seat). In another example, Block S140 can include generating a set of accident detection models for mobile computing devices coupled to different portions of a driver's body. In this example, a first and a second accident detection model can be generated for mobile computing devices coupled to the wrist (e.g., a smartwatch worn by the driver) and to a driver pocket (e.g., a smartphone within a pant pocket), respectively. Block S140 can accordingly include, in this example, retrieving the second accident detection model in response to mobile computing device light sensor data indicating a device position within the pocket of the driver. In another example, if it is detected or otherwise known that the navigation device is kept in a driver's pocket, the acceleration profile of the phone can be assumed to more closely match that of the vehicle than if the navigation device was set on (and not fixed to) the dashboard. However, dynamically adjusting an accident detection threshold, model, and/or reference profile can be performed in any suitable manner.

Block S140 can include testing for a vehicular accident event (e.g., generating a comparison with an accident detection threshold and/or reference profile, processing movement data with an accident detection model, etc.) in response to satisfaction of a condition (e.g., in Block S142), at predetermined time intervals (e.g., every second, minute, hour, etc.), manually triggered (e.g., a user requesting accident detection monitoring, such as when the user is unconfident about driving conditions, etc.) dynamically determined (e.g., based on movement-related data, supplementary-related data, etc.). In examples, Block S140 can include triggering the testing for a vehicular accident event in response to movement-related data indicating rapid deceleration (e.g., which can indicate an emergency braking situation), unusual position and speed data (e.g., a stationary vehicle in the middle of a highway), high-risk locations (e.g., an intersection with a high number of accidents), and/or other suitable movement-related events. In other examples, Block S140 can include initiating vehicular accident event testing in response to supplementary-related data including: mobile computing device characteristics (e.g., more frequent testing in response to the mobile computing device having a high state-of-charge, etc.), driver data (e.g., less frequent monitoring in response to driver data indicating low-risk driving behaviors, etc.), weather conditions (e.g., more frequent monitoring in response to retrieving weather data indicating heavy snowfall, etc.), traffic conditions (e.g., more frequent testing in response to identifying the vehicle in a high traffic location), and/or any other suitable supplementary data). However, testing for a vehicular accident event can be performed at any suitable frequency at any suitable time.

Block S140 preferably includes detecting one or more vehicular accident events at a mobile computing device associated with the vehicle (e.g., a mobile computing device within the vehicle, mounted to the vehicle, proximal the vehicle, etc.). In an example, Block S140 can include detecting a vehicular accident event at an offline (e.g., without internet connectivity) mobile computing device. Additionally or alternatively, Block S140 can be performed at a remote server and/or other suitable component.

However, detecting a vehicular accident event can be performed in any suitable manner.

3.4.A Performing Threshold Satisfaction Tests.

As shown in FIGS. 1 and 3, Block S140 can optionally include Block S142, which recites: performing threshold satisfaction tests. Block S142 functions compare at least one of movement-related data (e.g., raw movement data, movement features, extracted characteristics, etc.) and supplemental-related data (e.g., raw supplemental data, supplemental features, extracted characteristics, etc.) to threshold conditions for determining when to monitor for one or more vehicular accident events.

Block S142 preferably includes extracting a vehicle motion characteristic (e.g., to compare against motion characteristic threshold). Vehicle motion characteristics and motion characteristic thresholds can typify motion characteristic types including any one or more of: speed characteristics (e.g., average speed, instantaneous speed, speed variability, change in speed, etc.), acceleration (e.g., average acceleration, instantaneous acceleration, acceleration variability, change in acceleration, etc.), position (e.g., altitude, GPS coordinates, direction, location, etc.), turning characteristics (e.g., turn speed, turn radius, steering angles, wheel velocities, tire slip velocities, etc.), movement features, and/or any other suitable vehicle motion characteristics. For example, Block S142 can include extracting a vehicle motion characteristic, where the vehicle motion characteristic is a vehicular speed value, and where the threshold motion characteristic (e.g., to which the vehicle motion characteristic can be compared) is a vehicular speed threshold. In another example, Block S142 can include extracting a vehicle motion characteristic from a movement dataset (e.g., a location dataset and/or motion dataset), where the vehicle motion characteristic describes the movement of the vehicle within a time window of the first time period.

Further, Block S142 preferably includes comparing an extracted vehicle motion characteristic to a motion characteristic threshold. However, any suitable data can be compared to any suitable threshold.

Block S142 preferably includes initiating one or more actions (e.g., retrieving an accident detection model, comparing a movement feature to an accident detection threshold, collecting additional movement data and/or supplementary data, etc.) in response to satisfaction of a threshold condition (e.g., exceeding a threshold, being below or at a threshold, etc.). For example, Block S142 can include, in response to the vehicle motion characteristic exceeding the motion characteristic threshold: retrieving an accident detection model, receiving a location dataset collected at the location sensor of the mobile computing device during a second time period of the movement of the vehicle, where the second time period is after the first time period (e.g., a first time period where an initial location dataset and/or motion dataset were collected), and receiving a motion dataset collected at the motion sensor of the mobile computing device during the second time period. In another example, accident detection can occur only when a vehicle is traveling above 2 MPH, 5 MPH, 10 MPH, 20 MPH, 30 MPH, and/or any other suitable velocity threshold. In another example, before the first time period: generating a first accident detection trained model from first training data characterized by a first training data motion characteristic below a motion characteristic threshold (e.g., vehicular speed of 30 MPH), and generating a second accident detection trained model from second training data characterized by a second training data motion characteristic exceeding the motion characteristic threshold. In other examples, Block S142 can include performing one or more comparisons to a stopping distance threshold (e.g., stopping distance must be less than the typical emergency stopping distance), a movement cessation threshold (e.g., vehicle must not move for thirty seconds after a detected accident), an acceleration threshold (e.g., deceleration must be greater than free-fall deceleration/$9.8 \ ms^{-2}$), and/or any other suitable threshold.

Block S142 can be performed at specified time intervals (e.g., every second, every minute, every hour, etc.), in response to satisfaction of predetermined conditions (e.g., satisfaction of a data collection threshold), at any stage of processing (e.g., during an early stage of data processing before retrieving and/or using an accident detection model, etc.), and/or at any suitable time.

In a variation, Block S142 can include dynamically adjusting the motion characteristic threshold (e.g., during a vehicle driving session, in response to collecting movement data, at other suitable times, etc.). Dynamically adjusting one or more motion characteristic thresholds is preferably based on supplemental information, but can additionally or alternatively be based on movement data and/or other suitable data. For example, Block S142 can include: prior to comparing the vehicle motion characteristic to the motion characteristic threshold, dynamically adjusting the motion characteristic threshold based on a traffic dataset describing traffic conditions proximal the vehicle during the time period. In another example, Block S142 can include dynamically adjusting the motion characteristic threshold based on a supplementary weather dataset. In this example, dynamically adjusting the motion characteristic threshold can include reducing the vehicular speed threshold in response to the weather dataset indicating rainy weather conditions proximal the vehicle location.

However, performing threshold satisfaction tests can be performed in any suitable manner.

3.4.B Generating an Accident Detection Machine Learning Model.

As shown in FIGS. 1 and 3, Block S140 can optionally include Block S144, which recites: generating an accident detection machine learning model. Block S144 functions to train and/or use a machine learning model for detecting one or more vehicular accident events. Additionally or alternatively, Block S144 can function to determine a confidence level associated with whether detected vehicular accident event actually occurred.

Block S144 preferably includes training and/or updating one or more accident detection machine learning models with movement features (e.g., extracted in Block S130), supplementary features (e.g., extracted in Block S130), and/or any other suitable features. Training data can be acquired from collision events (e.g., single-vehicle accident, multi-vehicle accident, rear-end collision, head-on collision, side-impact, T-bone collision, pedestrian collision, hit and run, parking lot accident, major collision, minor collision, fender bender, vehicle damage characteristics), non-collision events (e.g., hard braking, rapid movement, sharp turning, cargo loading, parking, other driving actions, etc.), and/or any suitable event. Training data can be collected for different vehicle types (e.g., compact cars, mid-size, large, SUV, convertible, sedan, truck, commercial car, etc.), different road types (e.g., streets, highways, dirt paths, parking lots, non-drivable roads, roundabouts, etc.), different traffic scenarios (e.g., low traffic, high traffic, different traffic laws, single-lane traffic, multi-lane traffic, etc.), different passenger types (e.g., adult, child, female, male, etc.), different movement-related data (e.g., training data for vehicles exceeding 30 MPH), different supplemental-related data (e.g., training data for poor weather condition scenarios), and/or any suitable driving-related aspect. For example, Block S144 can include generating an accident detection machine learning model from training data including vehicular collision events and vehicular non-collision events, where the training data is characterized by a training data motion characteristic value exceeding a motion characteristic threshold.

Relating to Block S144, accident detection machine learning models can output one or more of: whether a vehicular accident event occurred, accident characteristics (e.g., as described in Block S160), confidence levels (e.g., associated with vehicular accident events and/or accident characteristics), and/or any suitable output.

However, generating an accident detection machine learning model S144 can be performed in any suitable manner.

3.5 Initiating an Accident Response Action.

As shown in FIGS. 1-3, Block S150 includes automatically initiating one or more accident response actions in response to detecting a vehicular accident event. Block S150 functions to appropriately response to a detected vehicular accident event.

In relation to Block S150, accident response actions can include any one or more of: presenting an accident-related notification (e.g., in Block S151), contacting emergency services (e.g., in Block S152), facilitating insurance processing (e.g., in Block S153), facilitating communication with a virtual assistant (e.g., in Block S154), communicating with a mobile computing device (e.g., in Block S155), storing accident-related data (e.g. storing movement data and/or supplemental data at a mobile computing device, at a remote server, etc.) and/or any other suitable types of response actions.

Block S150 can include automatically initiating a plurality of accident response actions (e.g., of the same type, of different types), etc. Types of accident response actions to perform can be selected based on one or more: movement datasets, supplemental datasets, features (e.g., movement features, supplemental features), accident characteristics (e.g., determined in Block S160), user preferences (e.g., preferred type of action response actions, number of action response actions, preferences received at an application executing on the mobile computing device, etc.), and/or any other suitable data. For example, Block S150 can include automatically contacting emergency services (e.g., rather than only notifying selected user contacts) in response to a vehicular speed movement feature exceeding a threshold vehicular speed. In another example, Block S150 can include prompting a user to signify that he/she is okay if a low-severity accident score accident is detected, but can include automatically notifying emergency services if a severe accident is detected. In another example, Block S150 can include presenting a driver education notification prompting the user to drive to the side of the freeway in response to detecting a vehicular accident event on a busy freeway. In another example, the method 100 can include determining a mechanical breakdown vehicular accident cause; and automatically facilitating communications with roadside assistance in response to identifying the mechanical breakdown. However, dynamically selecting an accident response action can be performed in any suitable manner.

Relating to Block S150, automatically initiating an accident response action is preferably in response to detecting one or more vehicular accident events (e.g., in Block S140), but can additionally or alternatively be initiated at any time proximal a vehicular accident event (e.g., before, during, and/or after a vehicular accident event), in response to determining one or more accident characteristics (e.g., in Block S160), in response to a request (e.g., through an API, a software development kit, etc.), based on user preferences, and/or at any suitable time. In an example, the method 100 can include calculating an accident confidence metric indicating a degree of confidence in occurrence of the vehicular accident event; receiving a request from a third-party service for the accident confidence metric; in response to receiving the request, automatically initiating an accident response action of transmitting the accident confidence metric to the third-party service for initiating a third-party accident response action.

However, initiating one or more accident response actions S150 can be performed in any suitable manner.

3.5.A Accident Response Action—Presenting an Accident-Related Notification

In a variation, Block S150 can optionally include Block S151, which recites: automatically presenting one or more accident-related notification. Accident-related notifications preferably inform a suitable entity of vehicular accident event-related data (e.g., the detection of the accident, movement data, supplemental data, accident characteristics, etc.), but can include any suitable accident-related information. Accident-related notifications can be presented to: authorities (e.g., a local police station), a service (e.g., emergency services, ride-sharing services, valet services, mapping services, navigation services, etc.), user-selected contacts, friends, family, loved ones, and/or any suitable entity. Accident-related notifications can include content in the form of one or more of: audio, graphical, verbal, and/or other suitable form. Further, accident-related notifications can be in the form of any one or more of: a phone call, a text message, an e-mail message, a printed message, a human notifier, and/or any other suitable form. For example, Block S151 can include in response to detecting a vehicular accident event, identifying a scheduled event in a calendar application executing on a user mobile computing device; and e-mailing participants of the scheduled event that the user was involved in the vehicular accident event.

Figures 6A, 6B:
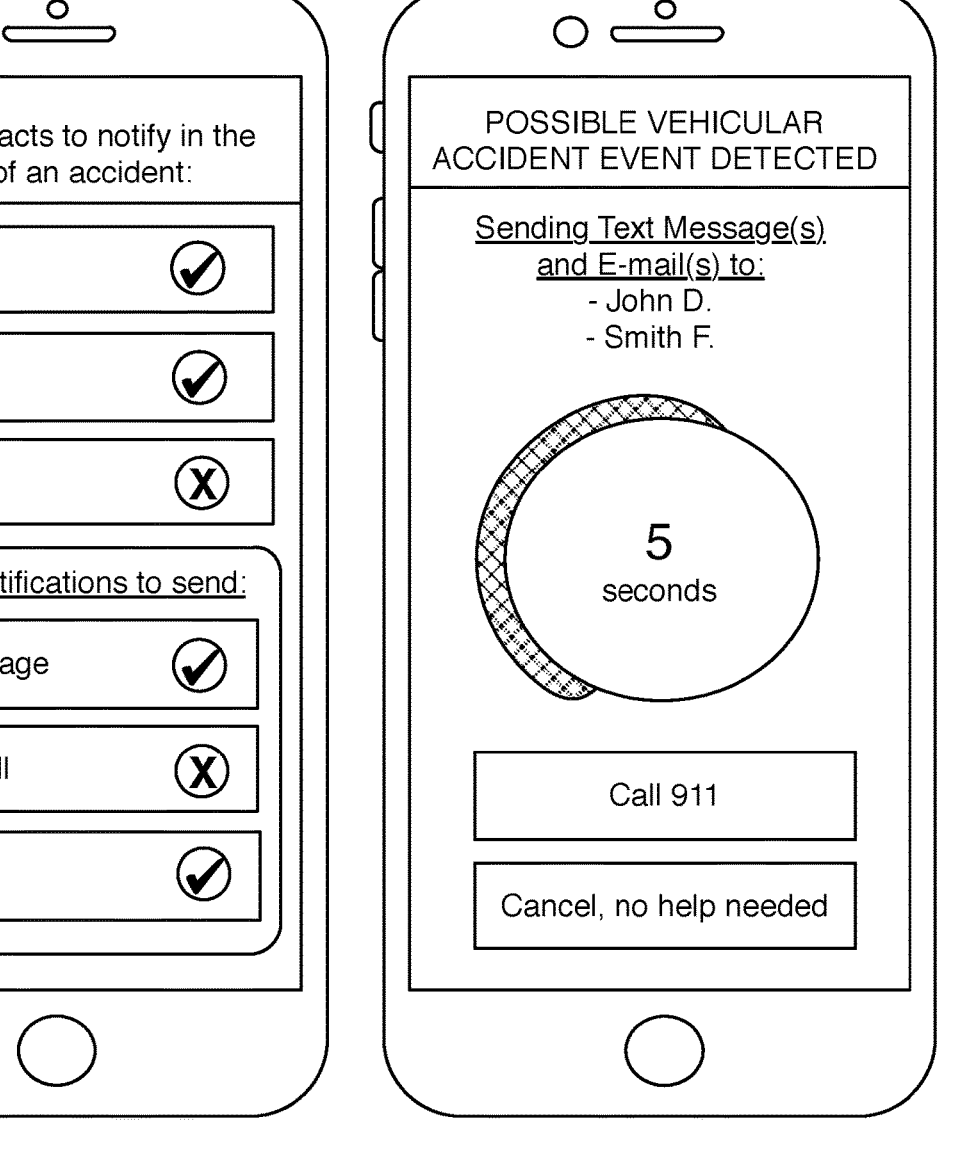
FIGS. 6A-6B is a graphical representation of a variation of an accident response action.

In an example, Block S151 can include generating and/or transmitting an audio message including accident-related information (e.g., location data, motion data, accident severity score, accident type, accident cause, other suitable data). In a specific example, as shown in FIGS. 6A-6B, the method 100 can include receiving, at the mobile computing device, a selection from a user of an emergency contact to notify in response to the detection of the vehicular accident event, where automatically initiating an accident response action includes, in response to detecting the vehicular accident event: automatically generating an audio message describing the vehicular accident event; initiating a phone call to the emergency contact through a telecommunications application programming interface (API, such as Twilio™, etc.); and emitting the audio message during the phone call. Automatically generating an audio message can be based creating a text prompt with vehicular accident event information; and inputting the text prompt into text-to-speech software (e.g., querying a text-to-speech API with the text prompt). However, any suitable techniques for personalized audio messaging can be used in generating and/or transmitting an audio message.

In another example, as shown in FIG. 8, Block S151 can include presenting an educational notification. Educational notifications can include any one or more of: reporting tips (e.g., for insurance purposes, for police report purposes, etc.), health tips (e.g., to guide the user in seeking healthcare if needed), driving tips (e.g., to avoid future accidents), and/or any other suitable educational information. In an example, Block S151 can include generating a driving tip notification based on driving behavior indicated by at least one of a movement dataset and a supplementary dataset (e.g., in response to detecting a lane switch without the driver using signal lights, advising the driver to use signal lights in future lane switches, etc.). In another example, Block S151 can include providing a user with a post-accident checklist (e.g., take pictures, ask if the other party is okay, get the other party's insurance information, etc.). However, presenting an educational notification S151 can be performed in any suitable manner.

In another example, Block S151 can include transmitting an accident-related notification to a mapping service (e.g., a navigation service, a directory, etc.). In a specific example, Block S151 can include presenting, to a navigation service, an accident-related notification including GPS coordinates, where the accident-related notification is configured to facilitate re-routing of traffic around the accident by the navigation service.

In another example, Block S151 can include presenting an accident-related notification to the owner of the vehicle in response to detecting a vehicular accident event where the owner was not present. Notifications presented to the vehicle owner and/or other related individuals can be used, for example, to assure customers of ride-sharing and/or valet services of the safety of vehicles lent to the ride-sharing and/or valet services.

However, automatically presenting one or more accident-related notifications can be performed in any suitable manner.

3.5.B Accident Response Action—Contacting Emergency Services

In another variation, Block S150 can optionally include Block S152, which recites: initiating communication one or more emergency services. Emergency services can include any one or more of: police services, firefighter services, medical services, roadside assistance services (e.g., AAA, towing services, etc.), and/or any other suitable emergency services. Communications with emergency services can be in any form analogous to those described with respect to notifications in Block S151. In an example, as shown in FIGS. 5A-5B, initiating communication with one or more emergency services can include, presenting, at the mobile computing device, a countdown to initiating a phone call with an emergency service (e.g., 911); providing, at the mobile computing device, a cancellation option to stop the countdown; and preventing the phone call in response to user selection of the cancellation option. In another example, as shown in FIG. 7, Block S152 can include enabling roadside service assistance for the vehicular accident event. In this example, Block S152 can include providing an estimated time of arrival for the road side service assistance.

In relation Block S152, communications transmitted to emergency services preferably include accident-related information (e.g., movement data, supplemental data, accident characteristics etc.). In an example, the method 100 can include receiving a camera dataset captured at a camera mounted to the vehicle; determining a number of passengers in the vehicle from the camera dataset, where the audio sample includes the number of passengers in the vehicle (e.g., in addition to GPS coordinates associated with the vehicular accident event and/or other suitable information). In this example, emergency services equipped with information regarding the number of passengers can appropriately allocate resources according to characteristics of the accident (e.g., multiple ambulance vehicles for a multi-passenger accident of high severity, etc.). In another example, the method 100 can include: generating an audio sample including GPS coordinates associated with the vehicular accident event, where the GPS coordinates are derived from a location dataset (e.g., received in response to an extracted vehicle motion characteristic exceeding a threshold motion characteristic); and transmitting the audio sample to an emergency service. In another example, Block S152 can include automatically pre-filling a police report with accident-related information; and transmitting the police report to local authorities.

However, contacting emergency services S152 can be performed in any suitable manner.

3.5.C Accident Response Action—Promoting Insurance Processing

In another variation, Block S150 can additionally or alternatively include Block S153, which recites: promoting insurance processing. Insurance processing can include any one or more of: pre-filling insurance claims, insurance education, transmitting accident-related information to an insurance company and/or related entities, and/or any other suitable action.

In an example, Block S153 can include automatically initiating a first notice of loss (FNOL) for alerting insurance companies associated with participants in the vehicular accident event. In another example, Block S153 can include receiving, at a mobile computing device, a selection from a user permitting information release to an insurance company, where the user is driving the vehicle during the time period, and where automatically initiating the accident response action includes automatically transmitting, to the insurance company, accident-related information derived from the movement dataset and associated with the vehicular accident event. In another example, Block S153 can include guiding a vehicular accident event participant through actions to take for properly filing an insurance claim (e.g., information to obtain, documents to file, questions to ask different parties, etc.). In another example, Block S153 can include deriving accident-related information from one or more camera datasets (e.g., captured by a mobile computing device, captured by a vehicular camera, etc.), and automatically preparing an insurance claim with the accident-related information. In another example, insurance-related information can be derived from social network data associated with one or more participants in the vehicular accident event.

Additionally or alternatively, Block S153 can include any elements described in U.S. application Ser. No. 14/566,408 filed 10 Dec. 2014 and entitled "System and Method for Assessing Risk through a Social Network," which is hereby incorporated in its entirety by this reference.

However, facilitating insurance processing can be performed in any suitable manner.

3.5.D. Accident Response Action—Enabling Communication with a Virtual Assistant

In another variation, Block S150 can additionally or alternatively include Block S154, which recites: enabling communication with a virtual assistant. A virtual assistant preferably aids with tasks related to vehicular accident events, including communications with services (e.g., emergency services, roadside assistance services, etc.) police reporting, insurance processing, post-accident tasks, questions to ask, data to capture (e.g., photos and/or video to capture, etc.), and/or any other suitable task. Virtual assistants can include any one or more of: a chat bot, vocal input bot, media bot, analysis bot, technical support bot, decision support bot, and/or any other suitable virtual assistant. In examples, Block S154 can include automatically generating an automated script for a virtual assistant, wherein automatic generation includes defining trigger patterns (e.g., patterns associated with a user question) and responses (e.g., a reply for the virtual assistant to transmit; actions to take such as querying a search engine, etc.) to an identified trigger pattern. However, determining virtual assistant inputs (e.g., triggers), outputs (e.g., responses), parameters (e.g., personality, etc.), and/or other related aspects can be based on natural language processing, artificial intelligence, and/or other suitable virtual assistant development tool.

In an example, Block S154 can include generating an automated script for a virtual assistant bot to follow regarding insurance processing (e.g., for guiding a user through the steps of filing an insurance claim for the vehicular accident event). In another example, Block S154 can include presenting, through a virtual assistant, a set of options for services for aiding with the vehicular accident event; receiving, from a user in communication with the virtual assistant, a roadside assistance service selection from the set of options for services; and transmitting a roadside service request to the roadside assistance service.

However, facilitating communications with a virtual assistance can be performed in any suitable manner.

3.5.E Accident Response Action—Communicating with a Mobile Computing Device

In another variation, Block S150 can additionally or alternatively include Block S155, which recites: communicating with a mobile computing device (e.g., a vehicle control panel, a medical device within the vehicle, a mobile computing device distinct from the mobile computing device collecting the movement dataset used in detecting the vehicular accident event, etc.). Communications with one or more mobile computing devices preferably includes controlling the one or more mobile computing devices to perform an accident-related operation to assist a participant in the vehicular accident event.

In an example, Block S155 can include transmitting accident-related information to a vehicle involved in the vehicular accident event, where the transmission is configured to enable accident services provided by the vehicle (e.g., in-vehicle security services, airbag deployment, emergency lights, etc.). In another example, Block S155 can include initiating communication with a medical device associated with the user. In a specific example, the method 100 can include: in response to detecting a vehicular accident event, automatically prompting (e.g., through a request transmitted by a smart phone) a medical device coupled to the user to collect cardiovascular data (e.g., heart rate data, blood pressure data, etc.) of the user; and transmitting the cardiovascular data in a communication with emergency services. In this specific example, emergency services such as a healthcare provider can leverage the cardiovascular data collected proximal the time period of the vehicular accident event in order to tailor healthcare to the harm caused.

In examples, Block S155 can include outputting therapeutic interventions at a mobile computing device. In a specific example, Block S155 can include promoting an stress-relieving intervention (e.g., calming audio, therapeutic stimulation, reassuring notifications, guided exercises, etc.) configured to relieve stress of a participant in the vehicular accident event. In this specific example, stress-relieving interventions can enable a driver and/or other accident participant to focus and respond properly to the vehicular accident event.

However, communicating with a mobile computing device can be performed in any suitable manner.

3.6 Determining an Accident Characteristic.

The method 100 can optionally include Block S160, which recites: determining one or more accident characteristics associated with the vehicular accident event. Block S160 functions to determine one or more characteristics regarding a detected vehicular accident event, in order to facilitate provision of an accident response action (e.g., in Block S150). For example, the method 100 can include selecting a personalized accident response action from a set of accident response actions, based on one or more accident characteristics (e.g., vehicular accident type). In a specific example, the method 100 can include in response to determining one or more accident characteristics (e.g., vehicular accident type), automatically pre-filling, at the mobile computing device, an insurance claim with the one or more accident characteristics. However, accident characteristics can be used for any suitable purpose.

In relation to Block S160, determining accident characteristics can include determining any one or more of: accident meta-information (e.g., in Block S161), accident severity score (e.g., in Block S162), accident type (e.g., in Block S163), accident cause (e.g. in Block S164), and/or any other suitable accident characteristic data.

Determining accident characteristics S160 is preferably based on movement data (e.g., movement features). For example, the Block S160 can include determining a vehicular accident type describing the vehicular accident event, based on at least one of the a location dataset and a motion dataset, where the location and motion datasets are received in response to a vehicle motion characteristic (e.g., extracted in Block S140 from a location dataset and/or motion dataset collected at an earlier time) exceeding a threshold motion characteristic. Additionally or alternatively, determining accident characteristics can be based on supplementary data and/or any other suitable accident-related information.

In relation to Block S160, determining accident characteristics is preferably based on processing with an accident characteristic model (e.g., an accident characteristic machine learning model, an accident characteristic decision tree model, etc.), but can additionally or alternatively be based on comparisons with accident characteristic thresholds, accident characteristic reference profiles, and/or any suitable mechanism.

For Block S160, determining accident characteristics is preferably performed substantially concurrently with detecting a vehicular accident event. Additionally or alternatively, determining accident characteristics can be performed after a vehicular accident event (e.g., in response to a user manually inputting accident-related information at the mobile computing device), and/or at any suitable time. Block S160 can be performed at a mobile computing device, remote server (e.g., in response to the remote server receiving accident-related information from multiple mobile computing devices), and/or at any suitable component.

3.6.A Accident Characteristics—Determining Accident Meta-Information

In a variation, Block S160 can include Block S161, which recites: determining accident meta-information. Accident meta-information can include any one or more of: driver data (e.g., driver identifier, driver behavior, etc.), accident location (e.g., GPS coordinates), temporal indicators (e.g., timestamp, duration of accident, duration of driving session, etc.), driving session identifier, tracking identifier, accident identifier, confidence metrics (e.g., confidence levels associated with detected vehicular accident event, confidence levels associated with accident characteristics, etc.), and/or any other suitable meta-information regarding a vehicular accident event. In an example, the method 100 can include calculating an accident confidence metric indicating a degree of confidence in occurrence of the vehicular accident event, based on at least one of the second location dataset and the second motion dataset; selecting a personalized accident response action from a set of accident response actions, based on the accident confidence metric, and where the personalized accident response action is the accident response action automatically initiated in response to detecting the vehicular accident event.

However, determining accident meta-information S161 can be performed in any suitable manner.

3.6.B Accident Characteristics—Generating an Accident Severity Score

In another variation, Block S160 can include Block S162, which includes generating an accident severity score. An accident severity score preferably provides an indication of how severe an accident might be (e.g., as measured with respect to vehicle damage, property damage, and/or injury to vehicle occupants or others), but can be otherwise defined. Accident severity scores are preferably generated based on movement data (e.g., measured acceleration magnitude, acceleration direction, pre-impact speed, etc.), but can additionally or alternatively be based on supplemental data, other accident characteristics, and/or any suitable data. For example, the method 100 can include determining an accident severity score based on a set of proximity features (e.g., extracted from proximity data collected at a vehicle proximity sensor) and the set of movement features; and selecting a personalized accident response action from a set of accident response actions, based on the accident severity score, and where the personalized accident response action is the accident response action. In another example, generating an accident severity score can include interpreting speech recorded by microphones of the navigation device; speech can be interpreted based on meaning (e.g., accident severity can be detected based on what people say) and/or emotion (e.g., accident severity can be detected based on identified emotions). Likewise, Block S162 can include interpreting vehicle sensor data (e.g., whether airbags deployed or not) as a measure of accident severity.

In relation to Block S162, accident severity scores are preferably generated by a single algorithm that takes into account accident severity variables (as discussed below), but can additionally or alternatively be generated according to different algorithms for different operating states. For example, one accident severity score algorithm can be used for pre-impact speeds of 30-50 MPH, while another accident severity score algorithm can be used for pre-impact speeds of 50-80 MPH.

Relating to Block S162, examples of accident severity variables include measured acceleration magnitude, measured acceleration direction (e.g., relative to travel direction), measured angular acceleration, measured velocity, acceleration profile (e.g., acceleration vs. time graph, this can be used to infer braking profile), velocity profile, measured position, vehicle stopping distance (e.g., as compared to typical emergency stopping distances), navigation device free-fall time (e.g., time where gravity is the primary acceleration acting upon the navigation device), impact noise magnitude, and measured movement data of surrounding traffic.

For Block S162, generating accident severity scores can include generating accident severity sub-scores. For example, S133 can include generating a free-fall score, a braking profile score, and a stopping distance score, each of which measure accident severity according to free-fall time, braking profile, and vehicle stopping distance respectively. From these three sub-scores, the accident severity score can be generated in any manner (e.g., the average of the three values, the maximum of the three values, etc.).

However, generating an accident severity score S162 can be performed in any suitable manner.

3.6.C Accident Characteristics—Determining an Accident Type

In another variation, Block S160 can include Block S163, which recites: determining an accident type of the vehicular accident event. Accident types can include any one or more of: single-vehicle accident, multi-vehicle accident, rear-end collision, head-on accident, side-impact, T-bone collision, pedestrian collision, hit and run, parking lot accident, major collision, minor collision, fender bender, vehicle damage characteristics, and/or any other suitable accident type. Multi-vehicle accident types can include accident types indicating the size of the vehicles involved (e.g., compact, mid-size, large, SUV, convertible, sedan, truck, commercial car, etc.). Vehicle damage characteristics can include any one or more of: vehicular damage location (e.g., rear, front, side, tires, etc.), mechanical damage (e.g., engine damage, brakes damage, etc.), electrical damage, and/or any other suitable damage type. Vehicle sizes of vehicles involved in a vehicular accident event can inform the determination of accident severity score, indications of fault, and/or other suitable accident characteristics. For example, determining that the vehicular accident event was a multi-vehicle accident involving a commercial truck and a convertible can indicate an accident of greater severity. In this example, the method 100 can include training an accident detection machine learning model with movement-related training data (e.g., position, velocity, acceleration profiles etc.) collected from multi-vehicle collisions involving different combinations of vehicle sizes (e.g., compact vs. mid-size, compact vs. large, mid-size vs. large); and identifying the relative size of vehicles involved in a vehicular accident event by processing a movement dataset and/or supplemental dataset with the accident detection machine learning model. In another example, Block S163 can include generating an analysis of vehicular acceleration over time; comparing the analysis to reference profiles for a single-vehicle accident (e.g., a vehicle crashing into a highway guardrail) and a multi-vehicle accident (e.g., a vehicle crashing into another vehicle while changing lanes); and identifying a multi-vehicular accident in response to detecting a greater similarity between the analysis and the reference profile for a multi-vehicular accident. In a specific example, identifying a single-vehicle accident type of a vehicle crashing head-on into a stationary object can be based on calculating a more negative slope in acceleration measured over time compared to a reference acceleration profile for a multi-vehicle accident type of a first vehicle side-swiping a second vehicle.

In another example, Block S163 can include determining an irregular change in tire pressure during a time period in which a vehicular accident event is detected; and identifying, based on the irregular change in tire pressure, a vehicle damage characteristic of tire damage resulting from the vehicular accident event. In another example, the method 100 can include collecting horizontal vehicle movement data (e.g., parallel the road); extracting turning movement features (e.g., left turn, right turn, turn radius, etc.) form the horizontal vehicle movement data; and in response to the turning movement features indicating a sharp turn, determining a high probability of a side collision (e.g., a T-bone accident). However, determining an accident type S163 can be performed in any suitable manner.

3.6.D Accident Characteristics—Determining an Accident Cause

In another variation, Block S160 can include Block S164, which recites: determining one or more causes of a vehicular accident event. Accident causes can include: indications of fault (e.g., which driver was at fault, proportion of fault allocated to different drivers and/or other entities, etc.), identification of entities involved in the accident (e.g., pedestrians, other vehicles, other drivers, passengers, etc.), driver behavior, and/or any other suitable potential cause of a vehicular accident event.

In relation to Block S164, identifying one or more accident causes is preferably based on at least one of a movement dataset and a supplemental dataset. For example, the method 100 can include detecting a two-vehicle collision between a first driver and a second driver; assigning a higher proportion of fault to the first driver based on a first movement dataset describing a first driver vehicular speed exceeding the speed limit identified from a traffic dataset, and based on a second movement dataset describing a second driver vehicular speed below the speed limit. In another example, the method 100 can include detecting a pedestrian collision from processing a movement dataset with an accident detection model, and determining an accident cause of an illegal left turn based on horizontal-axis accelerometer data from the movement dataset and a traffic dataset describing the traffic laws associated with the intersection at the site of the accident.

In examples, Block S164 can include identifying one or more accident causes from movement data and/or supplemental data collected prior to and/or after a vehicular accident event. In an example, Block S164 can include generating an analysis of video data capture prior to a vehicular accident event; and determining an accident cause based on the analysis. In a specific example, video data showing a second vehicle merging into a lane of a first vehicle can indicate the cause of a side-collision multi-vehicular accident event. In another example, Block S164 can include collecting rear proximity sensor (e.g., positioned proximal the trunk of the vehicle) data for a first vehicle during a time period prior to detecting a rear-end collision between the first vehicle and a second vehicle crashing into the rear of the first vehicle; generating an analysis of the rear proximity sensor data and movement-related data of the first vehicle during the time period; and assigning a higher proportion of fault to the second vehicle in response to the analysis indicating a stationary position of first vehicle and a lack of deceleration by the second vehicle. In another example, failing to identify sharp changes in movement data of a first vehicle prior to a side-collision vehicular accident event can indicate greater fault for a second vehicle that merged into a lane in which the first vehicle was traveling. In another example, Block S164 can include recording conversational audio between vehicular accident event participants and/or witnesses during a time period subsequent the vehicular accident event, and determining an allocation of fault between parties based on the conversational audio (e.g., by parsing the audio to identify admissions by a participant, observations from a witness, etc.). However, accident cause identification can be based on any suitable data.

Relating to Block S164, accident cause information is preferably used in initiating an accident response action. For example, the method 100 can include determining accident cause information based on at least one of a movement dataset and a supplemental dataset; and automatically generating a portion of an insurance claim including the accident cause information. In another example, the method 100 can include identifying an accident cause (e.g., an illegal U-turn from a nearby driver); and transmitting information regarding the illegal vehicular maneuver to local authorities (e.g., through automatically filling a police report with the information). However, accident cause information can be used for any suitable purpose.

However, determining one or more accident causes S164 can be performed in any suitable manner.

3.7 Receiving Accident Detection Feedback

The method 100 can optionally include Block S170, which recites: receiving accident detection feedback. Block S170 functions to receive feedback post-accident that can be used to measure accident severity (and thus calibrate and/or train the accident severity score generation algorithm).

Post-accident feedback can include any measure of accident severity, including user survey data (e.g., prompting a user to describe or rate the severity of the accident), accident reports, insurance claims, or any other data.

For example, S170 can include prompting a user to state if their vehicle can move under its own power. This data can be useful for both S140 (e.g., a tow truck can be contacted if the answer is no) and S160 (e.g., car being moveable being an indication of lower accident severity).

In a variation of a preferred embodiment, S170 includes measuring movement data and/or supplementary data post-accident to derive vehicle status information. For example, a vehicle moving shortly after an accident can be a sign that the accident was not very severe. As another example, changes in vehicle status information or accelerometer data recorded under normal driving can reflect damage to the vehicle (e.g., high oil pressure/temperature or unusual vibrations detected by accelerometer can be indications of vehicle damage).

S170 can include collecting any manner of post-accident feedback in any suitable manner, at any suitable time (e.g., months post-accident).

4. System

Figure 4:
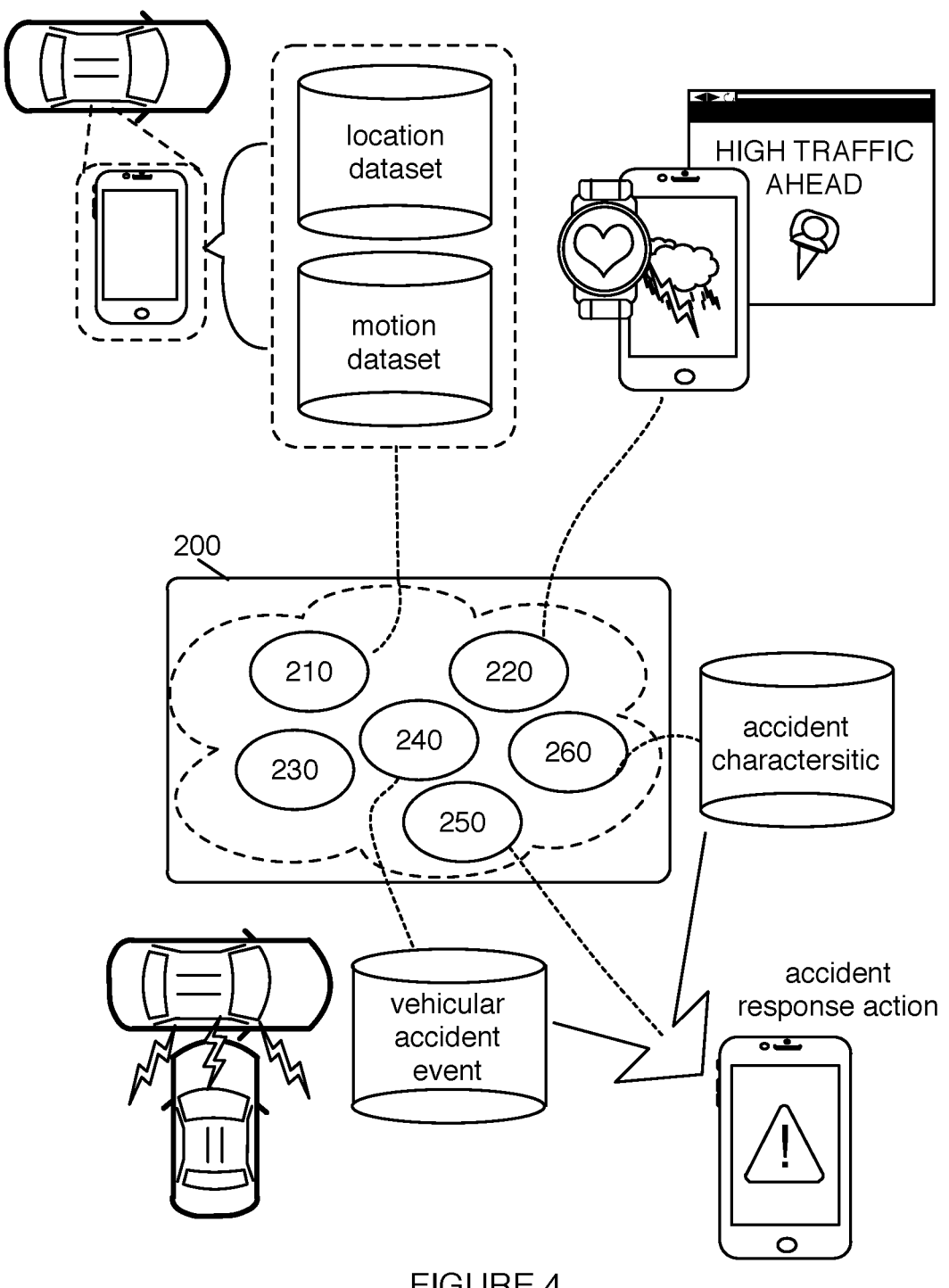
FIG. 4 is a graphical representation of an embodiment of the method.

As shown in FIG. 4, an embodiment of a system 200 for detecting a vehicular accident includes a processing system 205 including: a first module 210 configured to receive a movement dataset collected during a time period of vehicle movement; a second module 220 configured to receive a supplemental dataset during the time period; a third module 230 configured to extract a set of movement features associated with at least one of a position, a velocity, and an acceleration characterizing the movement of the vehicle during the time period; a fourth module 240 configured to detect a vehicular accident event from processing the set of movement features with an accident detection model; and a fifth module 250 configured to automatically initiate an accident response action in response to detecting the vehicular accident event. Additionally or alternatively, the system can include a sixth module 260 configured to determine an accident characteristic, and/or a seventh module configured to receive accident detection feedback. The system 200 functions to enable detection of one or more vehicular accident events based on movement data (e.g., relating to position, velocity, and/or acceleration) and/or supplemental data. Additionally or alternatively, the method 100 can function to identify one or more accident characteristics characterizing a detected vehicular accident event.

The system 200 can incorporate, at least in part, embodiments, variations, and examples of elements of the system described in U.S. application Ser. No. 14/566,408 filed 10 Dec. 2014 and entitled "System and Method for Assessing Risk through a Social Network," and U.S. application Ser. No. 14/206,721 filed 12 Mar. 2014 and entitled "System and Method for Determining a Driver in a Telematic Application," which are each hereby incorporated in their entirety by this reference.

Database(s) and/or portions of the method 100 can be entirely or partially executed, run, hosted, or otherwise performed by: a mobile computing device, a remote computing system (e.g., a server, at least one networked computing system, stateless computing system, stateful computing system, etc.), a machine configured to receive a computer-readable medium storing computer-readable instructions, or by any other suitable computing system possessing any suitable component (e.g., a graphics processing unit, a communications module, etc.). Mobile computing devices implementing at least a portion of the method 100 can include one or more of: a smartphone, a wearable computing device (e.g., head-mounted wearable computing device, a smart watch, smart glasses), tablet, desktop, a supplemental biosignal detector, a supplemental sensor (e.g., motion sensors, magnetometers, audio sensors, video sensors, location sensors a motion sensor, a light sensor, etc.), a medical device, and/or any other suitable device. All or portions of the method 100 can be performed by one or more of: a native application, web application, firmware on the device, plug-in, and any other suitable software executing on a device. Device components used with the method 100 can include an input (e.g., keyboard, touchscreen, etc.), an output (e.g., a display), a processor, a transceiver, and/or any other suitable component, where data from the input device (s) and/or output device(s) can be generated, analyzed, and/or transmitted to entities for consumption (e.g., for a user to assess their health parameters) Communication between devices and/or databases can include wireless communication (e.g., WiFi, Bluetooth, radiofrequency, etc.) and/or wired communication.

However, the components of the system 200 can be distributed across machine and cloud-based computing systems in any other suitable manner.

The system 200 is preferably configured to facilitate reception and processing of movement data and/or supplementary data, but can additionally or alternatively be configured to receive and/or process any other suitable type of data. As such, the processing system 205 can be implemented on one or more computing systems including one or more of: a cloud-based computing system (e.g., Amazon EC3), a mainframe computing system, a grid-computing system, and any other suitable computing system. Furthermore, reception of data by the processing system 205 can occur over a wired connection and/or wirelessly (e.g., over the Internet, directly from a natively application executing on an electronic device of the patient, indirectly from a remote database receiving data from a mobile computing device, etc.).

However, one or more mobile computing devices, vehicles, remote servers, and/or other suitable computing systems can be communicably connected (e.g., wired, wirelessly) through any suitable communication networks. For example, a non-generalized mobile computing device (e.g., smartphone including at least one of a location sensor and motion sensor, etc.) can be configured to collect a movement dataset, to receive additional movement datasets from the vehicle (e.g., OBD port) and/or other mobile computing devices (e.g., a wearable fitness tracker coupled to the driver's wrist), and to detect a vehicular accident event with the collected data, where the mobile computing device, the vehicle, and the other mobile computing devices are communicably connected through one or more wireless links (e.g., Bluetooth). In another example, a remote server can be configured to receive movement data from a vehicle and a mobile computing device, to detect a vehicular accident event based on the received data, and to automatically contact emergency services (e.g., through a telecommunications API), where the a remote server, vehicle, and mobile computing device are connected over a wireless network. However, the system 200 can include any suitable configuration of non-generalized computing systems connected in any combination to one or more communication networks.

Components of the system 200 and/or any suitable portion of the method 100 can employ machine learning approaches including any one or more of: supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and any other suitable learning style. Each module of the plurality can implement any one or more of: a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, a linear discriminate analysis, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked autoencoder method, etc.), a dimensionality reduction method (e.g., principal component analysis, partial least squares regression, Sammon mapping, multidimensional scaling, projection pursuit, etc.), an ensemble method (e.g., boosting, boostrapped aggregation, AdaBoost, stacked generalization, gradient boosting machine method, random forest method, etc.), and any suitable form of machine learning algorithm. Each processing portion of the method 100 can additionally or alternatively leverage: a probabilistic module, heuristic module, deterministic module, or any other suitable module leveraging any other suitable computation method, machine learning method or combination thereof.

The method 100 and/or system 200 of the embodiments can be embodied and/or implemented at least in part as a machine configured to receive a computer-readable medium storing computer-readable instructions. The instructions can be executed by computer-executable components integrated with the application, applet, host, server, network, website, communication service, communication interface, hardware/firmware/software elements of a patient computer or mobile device, or any suitable combination thereof. Other systems and methods of the embodiments can be embodied and/or implemented at least in part as a machine configured to receive a computer-readable medium storing computer-readable instructions. The instructions can be executed by computer-executable components integrated with apparatuses and networks of the type described above. The computer-readable medium can be stored on any suitable computer readable media such as RAMs, ROMs, flash memory, EEPROMs, optical devices (CD or DVD), hard drives, floppy drives, or any suitable device. The computer-executable component can be a processor, though any suitable dedicated hardware device can (alternatively or additionally) execute the instructions.

The FIGURES illustrate the architecture, functionality and operation of possible implementations of systems, methods and computer program products according to preferred embodiments, example configurations, and variations thereof. In this regard, each block in the flowchart or block diagrams can represent a module, segment, step, or portion of code, which includes one or more executable instructions for implementing the specified logical function(s). It should also be noted that, in some alternative implementations, the functions noted in the block can occur out of the order noted in the FIGURES. For example, two blocks shown in succession may, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

As a person skilled in the art will recognize from the previous detailed description and from the figures and claims, modifications and changes can be made to the embodiments of the invention without departing from the scope of this invention as defined in the following claims.

We claim:

1. A method comprising:
   determining a vehicle characteristic based on a first dataset sampled from a set of sensors of a user device during a first time period;
   in response to the vehicle characteristic satisfying a first condition, executing an accident detection routine comprising:

determining a second dataset sampled from a sensor associated with a user of the user device during a second time period, wherein the second dataset comprises biosignal sensor data;
   retrieving an accident detection model from a set of accident detection models, each accident detection model of the set of accident detection models associated with a portion of a user's body, wherein the accident detection model is retrieved based on a position of the user device with respect to the user's body;
   with the accident detection model, determining a vehicular accident event during the second time period based on the second dataset, wherein the accident detection model is trained to detect vehicular accident events with biosignal data; and
   with an accident characteristics model, determining a set of accident characteristics associated with the vehicular accident event based on the first dataset and the second dataset; and
   automatically triggering an insurance-related action based on the set of accident characteristics.

2. The method of claim 1, wherein the insurance-related action comprises: at least partially pre-filling an insurance claim based on the set of accident characteristics.

3. The method of claim 2, wherein the set of accident characteristics comprises a vehicular accident type.

4. The method of claim 1, wherein the insurance-related action comprises:
   receiving a driver selection permitting information release to an insurance entity; and
   transmitting an insurance claim to the insurance entity based on the driver selection.

5. The method of claim 1, wherein the set of accident characteristics comprises a damage location and a damage extent.

6. The method of claim 1, wherein the insurance-related action comprises:
   determining an adjusted vehicle insurance pricing metric for the user; and
   transmitting the adjusted vehicle insurance pricing metric to an insurance entity.

7. The method of claim 1, wherein the vehicle characteristic comprises a vehicle motion characteristic associated with vehicle motion during the first time period, wherein the first condition comprises a vehicle motion threshold.

8. The method of claim 7, wherein the set of sensors comprises at least one of a motion sensor or a location sensor.

9. The method of claim 8, wherein the second dataset further comprises at least one of a motion dataset or a location dataset.

10. The method of claim 1, wherein detecting the vehicular accident event based on the second dataset, further comprises detecting a blood pressure of the user is higher than an average blood pressure associated with the user.

11. The method of claim 1, further comprising receiving a weather dataset associated with a vehicle location, wherein detecting the vehicular accident event further comprises processing the weather dataset with the accident detection model.

12. The method of claim 1, further comprising receiving a traffic dataset proximate to a vehicle location, wherein detecting the vehicular accident event further comprises processing the traffic dataset with the accident detection model.

13. A system for vehicular accident detection, comprising:
a memory comprising computer-executable instructions, and
a processor configured to execute the computer-executable
instructions and cause the system to:

determine a vehicle characteristic based on a first dataset
sampled from at least one sensor of a user device during
a first time period; and in response to the vehicle characteristic satisfying a first
condition, execute an accident detection routine, comprising:

determining a second dataset sampled from a sensor of
a user of the user device during a second time period,
wherein the second dataset comprises blood pressure
data;

retrieving an accident detection model from a set of
accident detection models, each accident detection
model of the set of accident detection models associated with a portion of a user's body, wherein the
accident detection model is retrieved based on a
position of the user device;

with the accident detection model, detecting a vehicular
accident event during the second time period based
on the second dataset, wherein the accident detection
model is trained to detect vehicular accident events
with the blood pressure data; and with an accident characteristics model, determining a
set of accident characteristics associated with the
vehicular accident event based on the first dataset
and the second dataset; and in response to detection of an accident, automatically
trigger an insurance-related action based on the set of
accident characteristics.

14. The system of claim 13, wherein the insurance-related
action comprises: at least partially pre-filling an insurance
claim based on the set of accident characteristics.

15. The system of claim 14, wherein the set of accident
characteristics comprises a vehicular accident type.

16. The system of claim 13, wherein the insurance-related
action comprises:

receiving a driver selection permitting information release
to an insurance entity; and in response to the driver selection, transmitting, to an
insurance entity, an insurance claim.

17. The system of claim 13, wherein the set of accident
characteristics comprises a damage location and a damage
extent.

18. The system of claim 13, wherein the insurance-related
action comprises:

determining an adjusted vehicle insurance pricing metric
for the user; and transmitting the adjusted vehicle insurance pricing metric
to an insurance entity.

19. The system of claim 13, wherein:

the vehicle characteristic comprises a vehicle motion
characteristic is associated vehicle motion during the
first time period; and the first condition comprises a vehicle motion threshold.

20. The system of claim 13, wherein the accident detection routine further comprises receiving a weather dataset
associated with a vehicle location, wherein detecting the
vehicular accident event further comprises processing the
weather dataset with the accident detection model.

\* \* \* \* \*